United States Patent
Chikusa et al.

(10) Patent No.: US 7,328,392 B2
(45) Date of Patent: Feb. 5, 2008

(54) DISK ARRAY SYSTEM

(75) Inventors: Takashi Chikusa, Odawara (JP); Seiki Morita, Odawara (JP); Toshio Tachibana, Atami (JP); Takehiro Maki, Hadano (JP); Hirotaka Honma, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 515 days.

(21) Appl. No.: 10/978,392

(22) Filed: Nov. 2, 2004

(65) Prior Publication Data
US 2006/0059408 A1    Mar. 16, 2006

(30) Foreign Application Priority Data
Sep. 10, 2004    (JP) .............................. 2004-263186

(51) Int. Cl.
G11C 29/00    (2006.01)
(52) U.S. Cl. ..................................... 714/770
(58) Field of Classification Search ................ 714/768, 714/770
See application file for complete search history.

(56) References Cited

U.S. PATENT DOCUMENTS

| | | | | |
|---|---|---|---|---|
| 5,640,506 A | * | 6/1997 | Duffy | 714/6 |
| 5,758,057 A | * | 5/1998 | Baba et al. | 714/7 |
| 5,950,230 A | * | 9/1999 | Islam et al. | 711/156 |
| 6,629,158 B1 | * | 9/2003 | Brant et al. | 710/10 |
| 2002/0091897 A1 | * | 7/2002 | Chiu et al. | 711/114 |
| 2003/0023809 A1 | * | 1/2003 | Olfield et al. | 711/114 |
| 2003/0135577 A1 | | 7/2003 | Weber et al. | |
| 2004/0243912 A1 | * | 12/2004 | Larsen et al. | 714/770 |

* cited by examiner

*Primary Examiner*—Jacques Louis-Jacques
*Assistant Examiner*—Sam Rizk
(74) *Attorney, Agent, or Firm*—Reed Smith LLP; Stanley P. Fisher, Esq.; Juan Carlos A. Marquez, Esq.

(57) ABSTRACT

A disk array system is provided, which can improve data reliability by verifying addressing correctness of data access by applying a redundant code to user data even if using an HDD compatible with serial ATA, etc. whose sector length cannot be extended. When writing the object data to an HDD, a controller stores partly-extracted data of the object data in a control area and performs an XOR operation between the partly-extracted data and a check code generated by calculations. Then, the operation-resultant data (CC-embedded data) are returned to the object data and written in the HDD. Also, when reading the object data from the HDD, the controller fetches the CC-embedded data, performs an XOR operation between the fetched data and the check code, and compares and collates the operation-resultant data with the partly-extracted data in the control area to check the addressing correctness and restore the user data.

19 Claims, 26 Drawing Sheets

FIG.12

⟨IN WRITE PROCESS⟩

EXTRACTED DATA | CHECK CODE | | CC-EMBEDDED DATA
[ A ] XOR [ B ] = [ C ]

[ C ] = [ A ] XOR [ B ]

⟨IN READ PROCESS⟩

READ DATA | CHECK CODE | | RESULT
[ C ] XOR [ B ] = [ A ] XOR [ B ] XOR [ B ]
(NORMAL) (NORMAL)
= [ A ] XOR [ 0 ]
= [ A ]

FIG.13
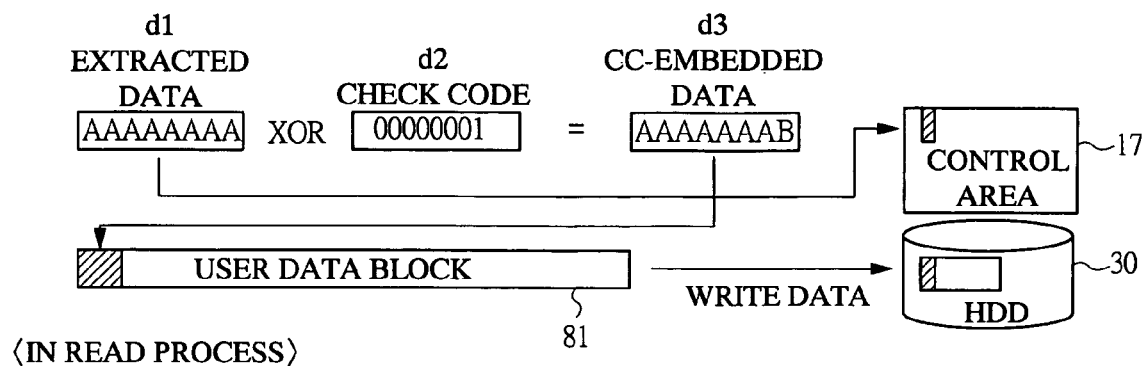
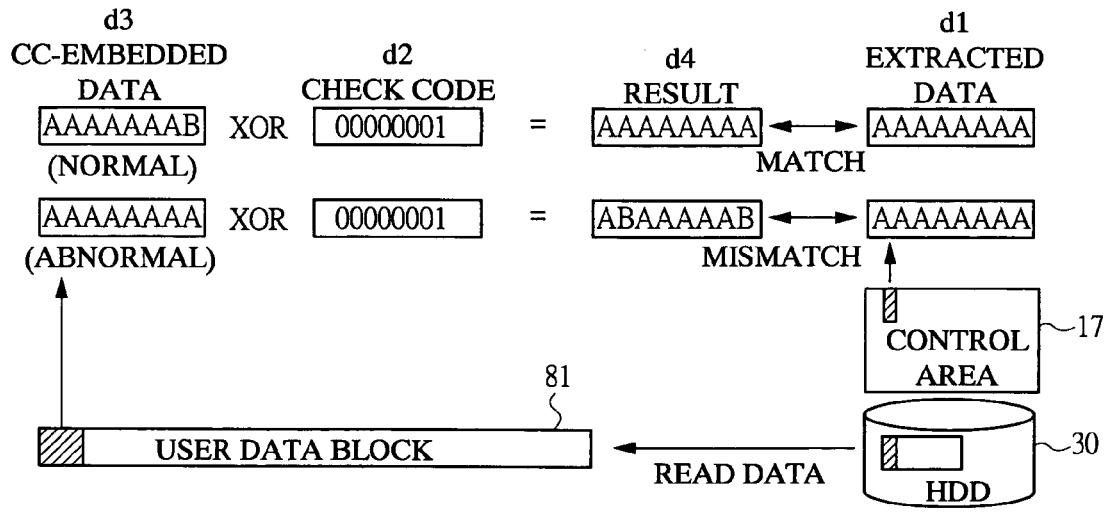

FIG.17
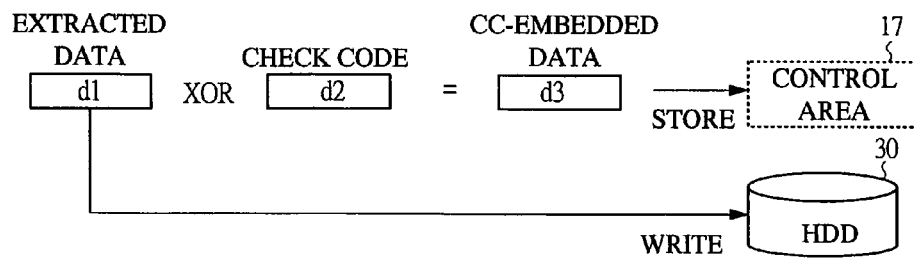
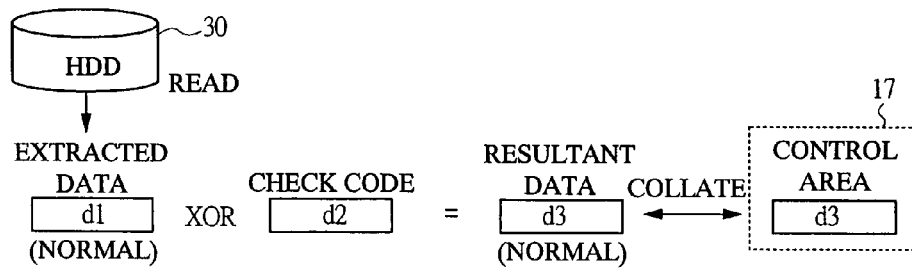
FIG.18
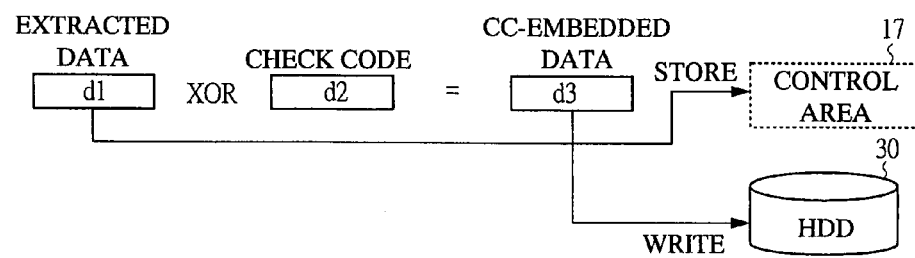
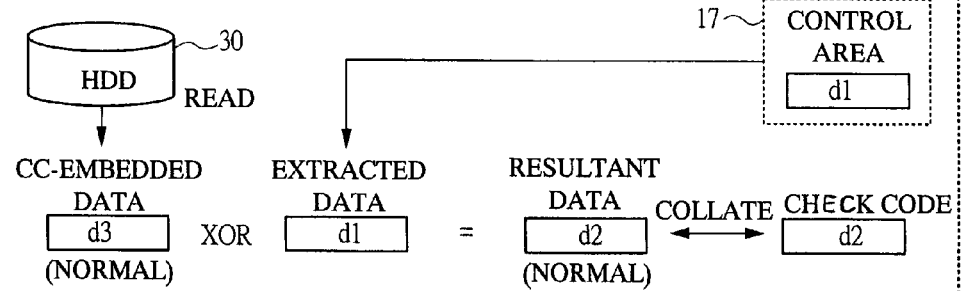

FIG.19
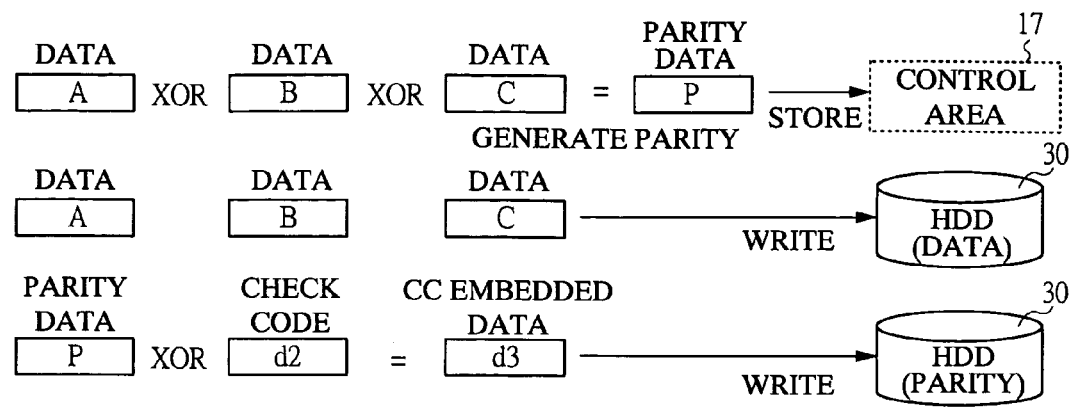
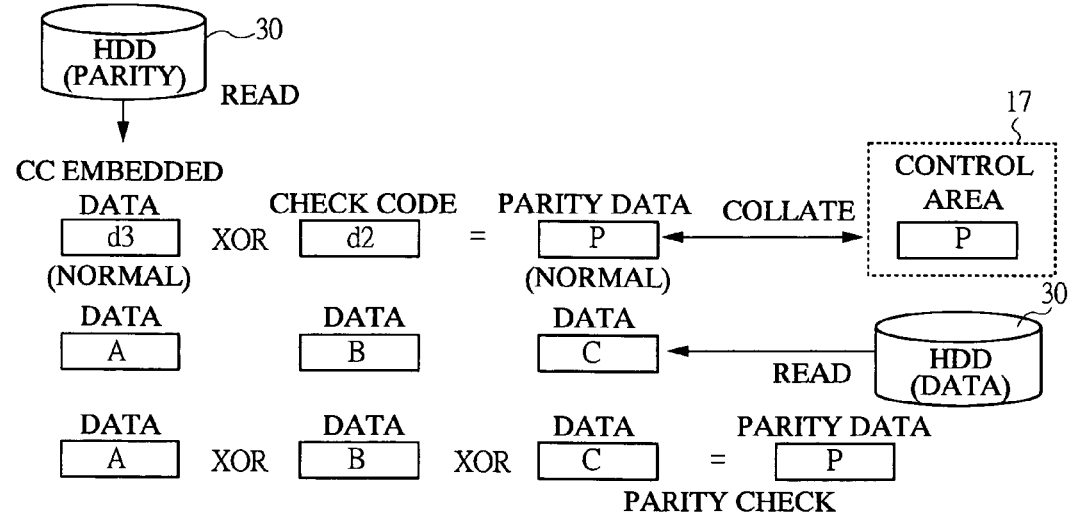

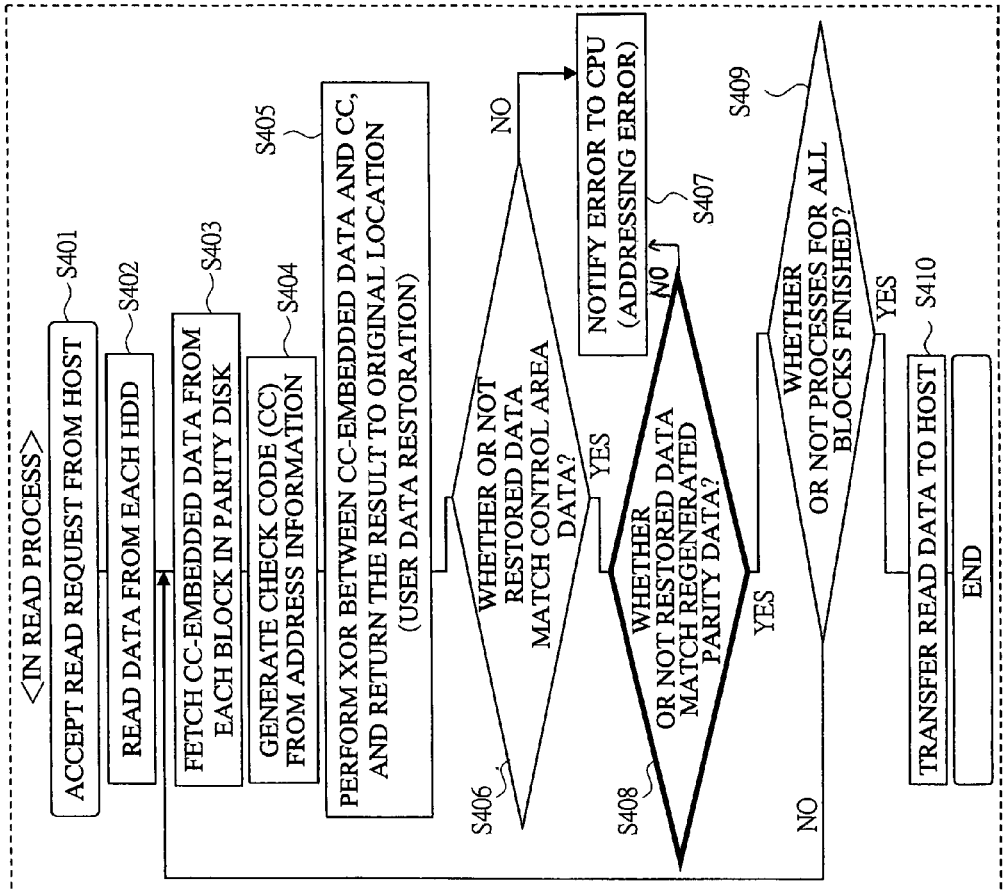
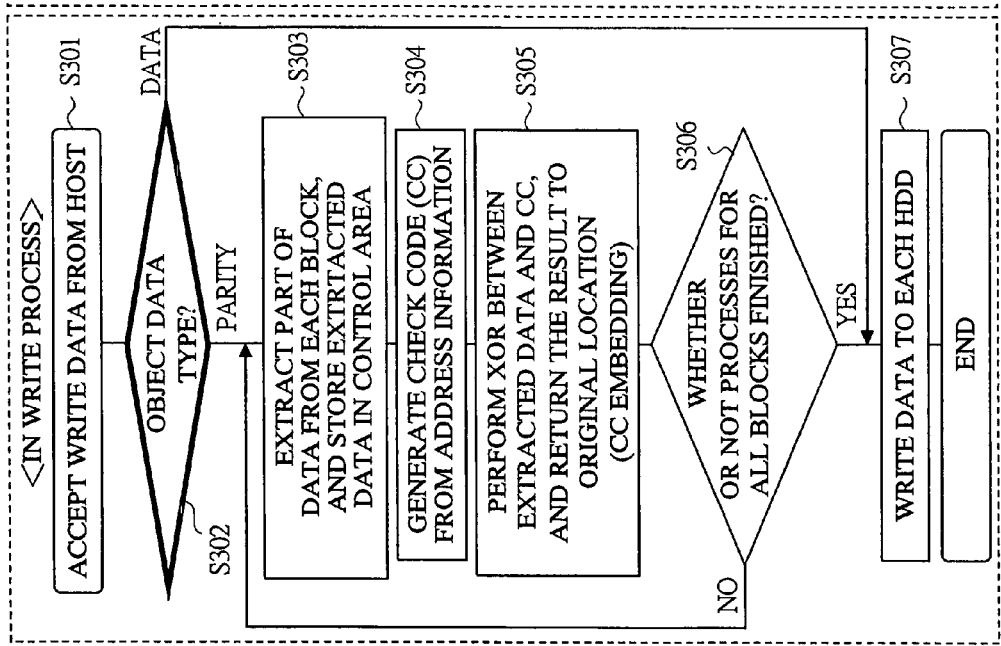

FIG.21
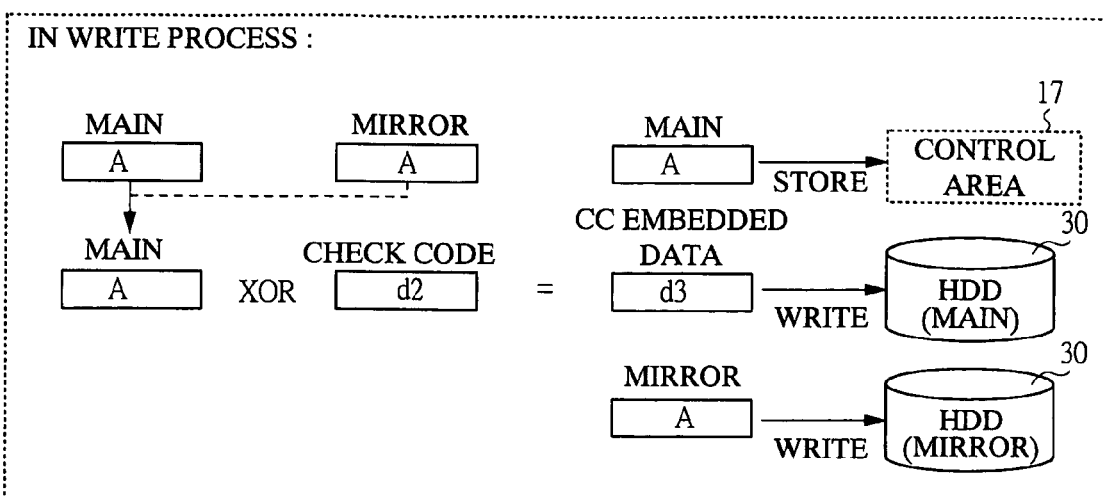
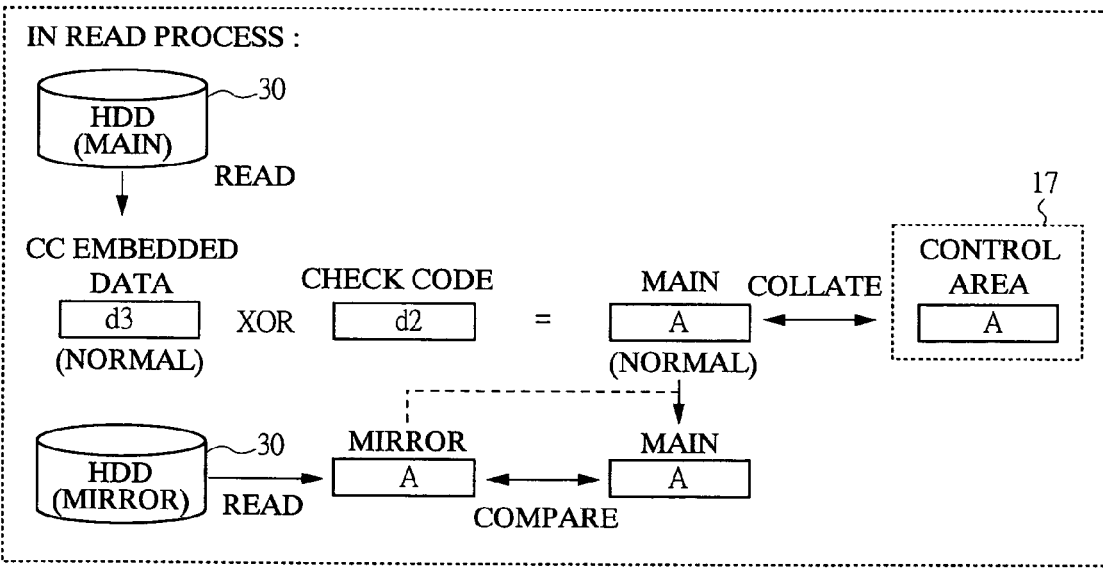

FIG.23

| OBJECT DISK | | ALL DISKS | | MIRROR / MAIN | | PARITY DISK | |
|---|---|---|---|---|---|---|---|
| | | HDD SIDE | CONTROL AREA SIDE | HDD SIDE | CONTROL AREA SIDE | HDD SIDE | CONTROL AREA SIDE |
| CC-EMBEDDED DATA APPLICABLE RAID LEVEL | 0 | ○ | △ | — | — | — | — |
| | 1, 0+1 | ○ | ○ | ○ | ○ | — | — |
| | 4, 5, (6) | ○ | ○ | — | — | ○ | ○ |
| CONTROL AREA CAPACITY | | LARGE | | MEDIUM | | SMALL | |
| COMPARISON AND COMBINATION USE OF PARITY/MIRROR | | NOT REQUIRED | | INDISPENSABLE | | INDISPENSABLE | |
| USER DATA CONVERSION PROCESS (LOAD) | | REQUIRED (LARGE) | NOT REQUIRED | REQUIRED (MEDIUM) | NOT REQUIRED | REQUIRED (SMALL) | NOT REQUIRED |
| WHEN CONTINUOUS UNIFORM DATA PROVIDED | | ○ | △ | ○ | △ | ○ | △ |
| PARTICULAR FORMAT PROCESS | | AUTOMATIC | REQUIRED | AUTOMATIC | REQUIRED | AUTOMATIC | REQUIRED |

FIG. 28

| ORIGINAL DATA ||| Mask Pattern | CONVERTED DATA |||
| Bus Data | ON bit | ELECTRIC POWER VARIATION | SIGNAL VARIATION | | Bus Data | ON bit | ELECTRIC POWER VARIATION | SIGNAL VARIATION |
|---|---|---|---|---|---|---|---|---|
| FFFFFFFF | 32 | - | - | 00010203 | FFFEFDFC | 28 | - | - |
| 00000000 | 0 | -32 | 32 | 04050607 | 04050607 | 8 | -20 | 28 |
| FFFFFFFF | 32 | 32 | 32 | 08090A0B | F7F6F5F4 | 20 | 12 | 24 |
| 00000000 | 0 | -32 | 32 | 0C0D0E0F | 0C0D0E0F | 12 | -8 | 28 |
| FFFFFFFF | 32 | 32 | 32 | 10111213 | EFEEEDEC | 24 | 12 | 20 |
| 00000000 | 0 | -32 | 32 | 14151617 | 14151617 | 13 | -11 | 28 |
| FFFFFFFF | 32 | 32 | 32 | 18191A1B | E7E6E5E4 | 20 | 7 | 24 |
| 00000000 | 0 | -32 | 32 | 1C1D1E1F | 1C1D1E1F | 16 | -4 | 28 |
| FFFFFFFF | 32 | 32 | 32 | 20212223 | DFDEDDDC | 24 | 8 | 16 |
| 00000000 | 0 | -32 | 32 | 24252627 | 24252627 | 13 | -11 | 28 |
| FFFFFFFF | 32 | 32 | 32 | 28292A2B | D7D6D5D4 | 20 | 7 | 24 |
| 00000000 | 0 | -32 | 32 | 2C2D2E2F | 2C2D2E2F | 16 | -4 | 28 |
| FFFFFFFF | 32 | 32 | 32 | 30313233 | CFCECDCC | 20 | 4 | 20 |
| ⋮ | ⋮ | ⋮ | ⋮ | | ⋮ | ⋮ | ⋮ | ⋮ |
| Average | - | - | 32 | | Average | - | 9 | 24.66666667 |
| % | - | - | 100 | | % | - | 28.125 | 77.08333333 |

DISK ARRAY SYSTEM

CROSS-REFERENCE TO RELATED APPLICATION

The present application claims priority from Japanese Patent Application JP 2004-263186 filed on Sep. 10, 2004, the content of which is hereby incorporated by reference into this application.

TECHNICAL FIELD OF THE INVENTION

The present invention relates to a disk array system (storage) which performs control for storing data in storage devices, and particularly relates to a data verification technique for ensuring data reliability in a disk array system.

BACKGROUND OF THE INVENTION

Recently, in accordance with the storage capacity increase of a disk array system, importance thereof in a data processing system has been increasing more and more. Therefore, in order to ensure reliability of user data in a disk array system, it is important to write data correctly in the required location according to a data input or output request given from a host such as a data processing unit and to detect incorrect data when the data read out in accordance with a request are incorrect.

Techniques for ensuring data reliability in a disk array system include a method in which a redundant code (check code) is added to the data which are to be stored in a storage device such as HDD (hard disk drive), and the addressing correctness in the data access is verified by the use of the added redundant code when the data is read.

An HDD compatible with conventional SCSI (Small Computer System Interface) or Fibre Channel (FC) employs a method in which the sector length thereof is extended and the redundant code is recorded in the extended part.

Also, in a specification of the U.S. Patent Application Laid-Open No. 2003/0135577, a disk array system employing ATA (AT Attachment) is described. ATA is of a type in which the sector length thereof is fixed and cannot be extended.

SUMMARY OF THE INVENTION

In addition to the HDDs compatible with FC, for example, HDDs compatible with a standard such as serial ATA or parallel ATA have begun to be applied as usable storage devices in the disk array systems. This is because, although the reliability thereof is inferior, the HDDs compatible with serial ATA, etc. are lower in price when compared with the HDDs compatible with FC, etc. Therefore, improving the reliability of user data is required also in such a disk array system which is formed by employing HDDs compatible with a standard such as ATA.

In a conventional disk array system, when write access is performed to the data striped over HDDs that form a RAID group, in order to improve data reliability, the above described redundant code which is used in the system is stored in the storage areas together with the user data. In this case, the redundant code is added to a sector (block) which is a storage area unit handled in HDDs. For example, the logical address of the object data and the HDD location information are employed as the redundant code. When read access is performed to the striped data from the above described HDDs, the read data and the redundant code are compared so as to check whether the addressing is correct and the data are correct.

In the HDDs compatible with SCSI or FC, a method is employed, in which the redundant code is recorded in a sector-length extended part so as to perform verification. However, since sector length cannot be extended in, for example, ATA (IDE) and serial ATA, it is impossible to employ the method in which the redundant code is recorded in the sector-length extended part. Therefore, in disk array systems and computer systems employing sector-length-fixed HDDs such as that of ATA, reliability in relation to the addressing correctness equivalent to that of systems employing HDDs compatible with SCSI or FC has not been ensured in a simple comparison.

The present invention has been accomplished in view of the foregoing problems, and an object thereof is to provide techniques for improving data reliability in a disk array system by performing verification of addressing correctness in data access by the use of a redundant code corresponding to the user data even if a storage device compatible with ATA, etc. in which area for the redundant code cannot be ensured by extending the data unit length is employed.

In relation to the foregoing, another object of the present invention is to provide techniques for improving data reliability by reducing data-pattern dependency in the hardware property of a disk array system so as to reduce a switching noise on the data bus.

Among the inventions disclosed in this application, summary of the typical ones is described in the following (1) to (6).

(1) In order to accomplish the above described objects, a disk array system of the present invention has one or more storage devices such as HDD, a controller (controlling device) for controlling the data storage to the storage devices, and a RAID control function for a plurality of storage devices connected to the controller, and the device is characterized by having the technical means described below.

The disk array system of the present invention has check means for verifying the addressing correctness of the data, which are the object for ensuring data reliability, i.e., the data including user data which are input to or output from the disk array system by a data processing unit serving as a host, in data access to the storage devices by the use of a check code (redundant code) used by the system.

In a check method by the check means, as a first process (check code embedding process), a part of the object data is extracted and an operation for embedding the check code in the extracted user data is performed in a write process of the object data to the storage device (hereinafter, simply referred to as a write process) so as to generate two relevant units of data (hereinafter, referred to as check data) employed in the check of correctness, i.e., first data which are the partly-extracted data having contents thereof unmodified and second data in which the check code is embedded (hereinafter, referred to as CC-embedded data), and then, one of them are returned to the original location (the extraction location) of the object data and stored and controlled in the storage device side, and the other data are stored and controlled in a control area side which is separated from the storage device in the system. The control area is an area accessed by the controller in order to control the processes.

In addition, as a second process (check process), in a read process of the object data from the storage device (hereinafter, simply referred also as a read process), the check means fetches the second data from the object data read from the storage device, the second data (have been read from the storage device side as the check data is subjected to an operation with the check code which is identical to that in the above described embedding, and the values of the operation-resultant data and the first data which have been stored in the control area side are compared and collated so as to check the addressing correctness of the object data, and then, when the first data are normal, the first data (identical to the original partly-extracted user data) which have been compared and collated are returned to the location of the first data (original partly-extracted data), and the user data are restored and transferred to the host.

Furthermore, in the first process in the write process, the check means performs an XOR (exclusive OR) operation as the operation to embed the check code in the first data. Also, in the second process in the read process, the check means performs an XOR operation as the operation performed between the check data which have been read from the storage device side and the check code and compares the values of the resultant data and the check data in the control area side so as to check the correctness. When the values match in the comparison, the check means judges that the addressing of the object data is normal, and when the values do not match, the check means judges that the addressing of the object data is abnormal (error).

The check code is the same value in the first process in the write process and in the second process in the read process and is generated by a calculation in the controller in every access based on, for example, the address information of the access object in the storage device in relation to the object data. Also, as the first process, the address information and a control code may be allocated and embedded as the check code respectively to the partly-extracted user data.

The check means also performs, in the write process, the first process for each block of the object data having a predetermined size corresponding to the processing data unit handled in the storage device, and also, in the read process, the check means performs the second process for each block of the data which have been read from the storage device. Also, the processing data unit (block) according to the check means and the data unit employed to store the check data in the control area (e.g., the extraction location and the number of extracting bytes of the object data) are configured in accordance with, for example, the sector unit of the storage device, the cluster unit in an OS of the disk array system, and the stripe unit of a RAID system. The units may be arbitrarily configured by, for example, a program.

The control area is provided, for example, in a memory (referred to as a first memory) which is included in the controller and can be accessed directly from a processing unit in the controller which executes the first and second processes, and the access path from the processing unit to the first memory is provided separately from the access path to the storage device.

The controller is formed of, for example, a CPU, a memory, a data controller, a cache memory, a channel controlling unit, and a disk controlling unit. The first process and the second process using the check means are executed by a processing unit such as the CPU, the data controller, and the disk controlling unit. The data controller performs the processes, for example, the transfer of controlling information and data between the members in the controller. The object data are temporarily stored in the cache memory. The channel controlling unit performs communication processes including the input and output of the object data to or from the data processing unit which serves as a host. The disk controlling unit performs communication processes including the input and output of the data to or from the storage device.

The storage device employed in the disk array system of the present invention may be an HDD compatible with, for example, ATA or serial ATA of a type in which a handled data unit length such as a sector or a block is fixed (cannot be extended), but not limited to this and may be an HDD compatible with, for example, SCSI or FC of a type in which the handled data unit length can be extended. The storage device writes the object data transferred from the controller to the disk; and reads the object data from the disk and transfers the data to the controller.

Another disk array system of the present invention has, in addition to the first memory, a non-volatile second memory (i.e., flash memory or Magnetoresistive memory storage, etc.) which is connected to the controller separately from the storage device so as to be directly accessible at a high speed, and the check means performs a process of saving or loading the check data, which are to be stored in the control area in the first memory (referred to as first control area), to or from an area in the second memory (referred to as second control area). In accordance with needs, the controller stores the check data in the second control area, transfers the data in the first control area to store in the second control area, and transfers the data in the second control area to store in the first control area. For example, the first control area in the first memory is usually used, and when not much capacity of the first memory is left, the second control area in the second memory is used.

In another disk array system of the present invention, the check means performs a process for saving or loading the check data, which are to be stored in the first control area, to or from the area in the system area which is provided in the storage device (referred to as a third control area). For example, the first control area in the first memory is usually used, and when the address of the object data falls outside the range of the address which is covered by the check data, the check data are saved in the corresponding location in the third control area in the system area of the storage device, the check data covering the address of the object data are newly loaded to the first control area in the first memory, and the process is continued. When the check data are saved to or loaded from the third control area in this configuration, data reliability of the CC-embedded data can be improved by performing the highly reliable processes to the check data stored in the third control area, for example, adding a check code such as sum check or ECC which is more effective than the check code added to the user data, and multiplex writing of the check data.

In another disk array system of the present invention, the check means employs, as the check data, the data partly extracted from a plurality of locations including data-updated area in a unit of processing data of the object data. For example, the data partly extracted from two locations are employed. In the first process in the write process, the check means stores the first data which have been partly extracted from the first extraction location of the object data, the second data which have been partly extracted from the second extraction location in the data-updated area other than the above extraction area, and the information indicating the second extraction location as a set of the check data into the control area side. The CC-embedded data which have been created by an operation with the check code are returned to the object data at a first location corresponding to the first partly-extracted data, and no operation is performed for the data at the location corresponding to the second partly-extracted data. Then, in the second process in the read process, the data created by performing an operation between the data in the location corresponding to the first partly-extracted data and the check code which is identical to that in the embedding are compared and collated with the first partly-extracted data in the check data, and the data in the second location corresponding to the second partly-extracted data specified by information indicating the second extraction location are compared and collated with the second partly-extracted data in the check data. In this manner, the check process is performed.

The configuration as follows is also available, in which the length of the two extraction data is made half of that of the check code generated from an operation by the system, the front-half part of the check code is subjected to operation with the data in the first location corresponding to the first partly-extracted data, the latter-half part of the check code is subjected to an operation with the data in the location corresponding to the second partly-extracted data, and each of them are embedded again to respective locations. In this manner, in the second process in the read process, the check process can be performed by the use of the read check data corresponding to the two extraction locations.

As the RAID control function, the disk array system of the present invention particularly performs striping of the object data and a parity process to the storage device group which forms the RAID group in accordance with the RAID system so as to perform a process for inputting or outputting the data (non-parity) and the parity in parallel to the storage device group, and it also executes the first and second processes by the check means by employing all or a part of the storage devices (or storage area) in the storage device group as the object. When the parity process is performed, striping of the object data, and generation and addition of parity are performed in the write process, and the data are written to the storage device (data disk) which is a data storing destination and the parity is written to the storage device (parity disk) which is the parity storage destination. In the read process, parity check of the data in the data disk can be performed by the use of the parity in the parity disk.

The disk array system of the present invention, particularly, the check means performs the first and second processes by employing all the data which have been striped in the storage device group and the parity as the object. In this system, together with the processes of the RAID control employing the parity, the check means performs the first process to the striping data in the write process.

Another disk array system of the present invention, particularly, the check means performs the first and second processes by employing the parity alone as the object from among the data which have been striped in the storage device group and the parity. In this system, together with the processes of the RAID control employing the parity, the check means performs the first process to the parity in the write process, and the correctness of the parity which have been read from the parity disk is checked by the second process, and the check (parity check) of the data which have been read from the data disk is performed by the use of the correctness-checked parity in the read process.

Another disk array system of the present invention, as the RAID control function, particularly performs a mirroring process of the object data to the storage device group which forms the RAID group in accordance with the RAID system, performs a process for inputting or outputting the identical data to or from the storage device group which forms the mirror, and also executes the first and second processes by the check means by employing the one of the storage devices (or storage areas) which forms the mirror as the object. This system performs, for example, a double writing process of the object data to the two storage devices which form the mirror, i.e., performs a process for inputting or outputting the identical data to or from a main disk and a mirror disk, and it also executes the first and second processes by the check means by employing, for example, the main disk as the object. In this system, together with the RAID control in which the mirroring is performed, the check means performs the first process to one of the mirrored data in the write process, and in the read process, it also performs the second process by the use of the data read from the one storage device on which the first process has been performed, and then, check of the other data in the mirror is performed by the use of the correctness-checked data.

In another disk array system of the present invention, the check means controls the object data in one unit collectively including a plurality of processing data units (blocks) with a predetermined size corresponding to the unit of processing data handled in the storage device and performs the first and second processes so as to reduce the needed capacity of the control area. In the write process, the check means performs an operation for embedding the check code in the first data which have been extracted partly from a part of the blocks in the plurality of the blocks of the object data, returns the second data, in which the check code has been embedded, to the object data to store the data in the storage device side, and stores the first data and the resultant data of XOR operations of parts of data of other blocks in the plurality of blocks corresponding to the extraction location in the above described part of the blocks into the control area side as a set. Then, in the read process, the check means fetches the second data from the object data which have been read from the storage device, performs an operation between the fetched data and the check code, and checks the correctness of the plurality of blocks by the use of the resultant data of the operation, the first data in the control area side, and the resultant data of XOR operations of the parts of the data of above described other blocks.

In another disk array system of the present invention, in a configuration in which data and parity are stored in the storage device for the RAID control, the second process is not performed in a usual read process, and the second process is performed at the same timing as the execution of parity check by the sampling of the data (data and parity) which are stored in the storage device so as to check the correctness.

(2) Another disk array system of the present invention has check means (second check means) for verifying the addressing correctness in a method different from that of above described (1). The storing destinations of the first and second data are different. In a check method by the second check means, as the first process in the write process, an XOR operation for embedding a check code in first data which have been extracted partly from the object data is performed, the second data in which the check code has been embedded are stored in a control area side which is separated from the storage device, and the first data of unmodified object data are stored in the storage device side. As a second process in the read process, in relation to the data read from the storage device as the object data, the first data fetched from the storage device side are subjected to an XOR operation with the check code, and the correctness is checked by comparing the values of the operation-resultant data and the second data which have been stored in the control area side.

Also in this configuration, similar to the configuration of above described (1), when the RAID control is performed, the object of the first and second processes in the storage device group may be all the storage devices, or a part of them, for example, only the parity disk.

(3) The disk array system of the present invention also has check means (third check means) for verifying the addressing correctness in a method different from that of above described (1). The procedure of the check employing the respective data in the second process is different. In a check method by the third check means, as a first process in a write process, similar to the above described (1), an XOR operation for embedding the check code is performed to the first data which have been partly extracted from the user data, the first data are stored in the control area side which is separated from the storage device, and the second data in which the check code is embedded are returned into the object data and stored in the storage device side. Then, as a second process in the read process, unlike above described (1), the object dat is read from the storage device, the second data is fetched from the storage device side and then subjected to an XOR operation with the first data which have been stored in the control area side, and the correctness is checked by comparing the values of the operation-resultant data and the check code.

Also in this configuration, similar to the configuration of above described (1), when the RAID control is performed, the object of the first and second processes in the storage device group may be all the storage devices, or a part of them, for example, only the parity disk.

(4) The disk array system of the present invention also has check means (referred to as fourth check means) for verifying the addressing correctness in a method different from that of above described (2). The procedure of the check employing the respective data in the second process is different. In a check method by the fourth check means, as a first process in a write process, similar to the above described (2), an XOR operation for embedding the check code is performed to the first data which have been partly extracted from the object data, second data in which the check code has been embedded are stored in the control area side which is separated from the storage device, and the first data of unmodified object data are stored in the storage device side. As a second process in the read process, unlike above described (2), in relation to the object data is read from the storage device, the first datais fetched from the storage device side and then subjected to an XOR operation with the second data which have been stored in the control area side, and the correctness is checked by comparing the values of the operation-resultant data and the check code.

Also in this configuration, similar to the configuration of above described (1), when the RAID control is performed, the object of the first and second processes in the storage device group may be all the storage devices, or a part of them, for example, only the parity disk.

Another disk array system of the present invention has a function to perform a particular process, particularly in accordance with the configuration of above described (2), in which the check means changes the storing destinations of the first and second data respectively to the other side in the storage device side and the control area side according to the data pattern of the object data. For example, in a format process of the storage device, a process (particular format process) is performed in which the check method of above described (2) is changed to the check method of above described (1). That is, when the object data have a specific data pattern, for example, the data have all "0", the first data (all "0") are stored in the control area side, and the second data (CC-embedded data) are stored in the storage device side.

(5) Another disk array system of the present invention has, in addition to the above described configuration having the check means, error processing means which performs a process (error process) to handle the abnormal state of the disk array system when an addressing error is detected by executing the RAID control and the check process regarding the addressing correctness. When an error is detected based on the result of the check process performed by the check means, error notification is performed to the processing unit of the controller, and the processing unit of the controller performs the error process based on the notification. There provided an error process (P1) which corresponds to the case where the first process is performed for all storage devices in the storage device group and an error process (P2) which corresponds to the case where the first process is performed for the storage device which stores the parity alone.

The error processing means performs a process according to the RAID control having the redundant storage device (parity disk or mirror disk), for example, the parity check and the mirroring, a process for judging the type of the abnormality based on the check process by the check means, for example, the error of only one storage device, the error of the control system, or the error of the access system of the storage device group, a process for isolating the part which has been judged to be abnormal, and a process for restoring the data stored in the part which has been judged to be abnormal by the use of a redundant storage device.

(6) Another disk array system of the present invention has, in addition to the configuration of above described (1), data conversion means which avoids a specific data pattern by performing an embedding process (data conversion process) of an orderly code (mask pattern) obtained by a calculation for the data to be stored in the storage device. This system performs, in the write process, the first process for the user data by the check means and an XOR operation by the data conversion means for embedding the mask pattern in the area other than the user area of the first process so as to generate a write pattern, and write it to the storage device. Then, in the read process, the data conversion means restores the original data by performing a data conversion process opposite to that in the write process, and the check means checks the correctness by performing the second process.

Effects attained by the typical ones of the inventions disclosed in this application, are simply explained below.

According to the present invention, it is possible to provide a disk array system which can improve data reliability by performing verification of addressing correctness in data access by the use of a redundant code corresponding to the user data even in the case where a storage device compatible with serial ATA, etc. in which area for the redundant code cannot be ensured by extending the data unit length is employed.

Also, particularly according to the configurations of (1) to (4) which have been described in the above, the access correctness of read and write performed to or from the storage device can be confirmed, and the data reliability can be ensured without deteriorating I/O performance to or from the storage device.

Also, particularly according to the configuration of (5) which has been described in the above, the data maintainability can be improved by detecting an error based on the result of the correctness check and performing an appropriate procedure in accordance with the state of abnormality.

Also, particularly according to the configuration of (6) described in the above, since improvement effects for the hardware reliability lowering factors are attained by reducing data-pattern dependency in the hardware property of a disk array system and reducing a switching noise on the data bus, data reliability can be improved.

BRIEF DESCRIPTIONS OF THE DRAWINGS

FIG. 1A shows the front and FIG. 1B shows the rear;

FIG. 12 is an explanatory diagram illustrating the principle relating to an addressing correctness check in the disk array system of the first embodiment of the present invention;

FIG. 13 is an explanatory diagram illustrating specific operation examples relating to the check method which is employed in the disk array system of the first embodiment of the present invention;

FIG. 17 is an explanatory diagram illustrating the process according to the check method which is employed in a disk array system of a fourth embodiment of the present invention;

FIG. 18 is an explanatory diagram illustrating the process according to the check method which is employed in a disk array system of a fifth embodiment of the present invention;

FIG. 19 is an explanatory diagram illustrating the process according to the check method which are employed in combination with parity check in a disk array system of a sixth embodiment of the present invention;

FIGS. 20A and 20B are flow diagrams of the processes performed by a controller according to the check method which is employed in the disk array system of the sixth embodiment of the preset invention;

FIG. 21 is an explanatory diagram illustrating the process according to the check method which is employed in combination with mirroring in a disk array system of a seventh embodiment of the present invention;

FIG. 23 is a table summarizing characteristics of the combinations of the check methods which are employed in the disk array systems of the embodiments of the present invention;

Figure 27A:
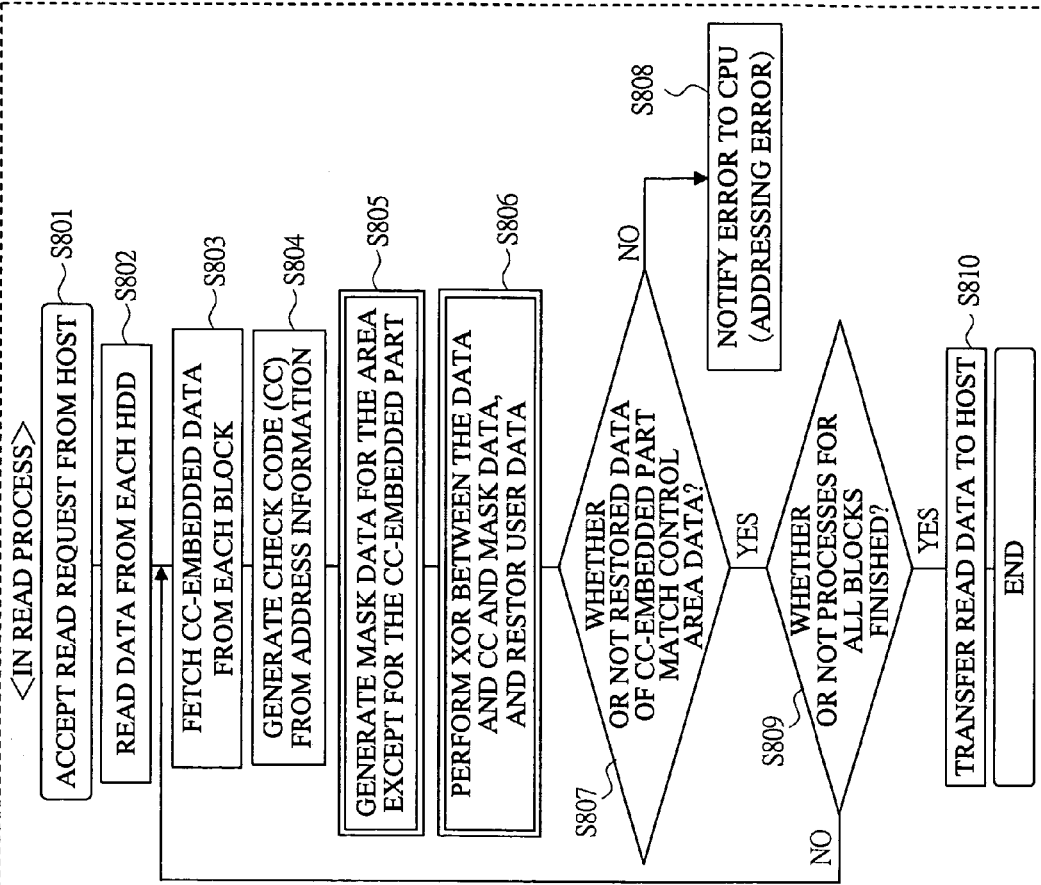
Figure 27B:
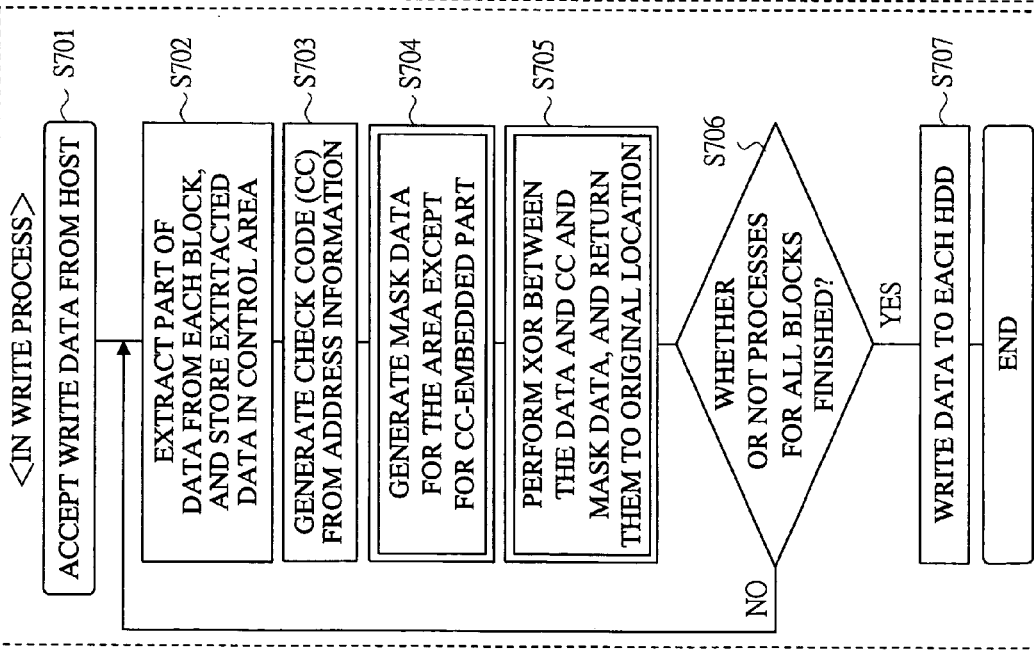

FIGS. 27A and 27B are flow diagrams of a data conversion process by a controller in the case where the process is performed for all disks in the plurality of HDDs in the disk array system of the tenth embodiment of the present invention; and FIG. 28 is a table showing a comparison in bit variations between the case where data conversion process is not performed and the case where the conversion process is performed when the data patterns having a large power supply variation factor are employed in the disk array system of the tenth embodiment of the present invention.

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

First Embodiment

FIGS. 1A and 1B to 14 show processes and the configuration of a disk array system of a first embodiment of the present invention. In the disk array system of the first embodiment, as a check method, a controller (10) employs the user data to be written to an HDD (30) as the object and extracts a part thereof, performs an XOR operation for embedding a check code corresponding to the access location to the extracted data, returns the check-code-embedded data to the location in the original user data to store the data in HDD (30) side; and stores the partly-extracted data which have its contents unmodified in a control area (17) side which is in a memory (12) of the controller (10). Then, when the user data are read from the HDD (30), the check-code-embedded data are fetched and subjected to an XOR operation with a regenerated check code, and the operation-resultant data are compared with the partly-extracted data which have been stored in the control area (17) so as to check the addressing correctness of the data access. In the first embodiment, the above described processes are performed for all disks in an HDD group. Accordingly, the addressing abnormality of the HDD group can be detected.

<Hardware Configuration>

First, the hardware configuration of a disk array system (100) which is commonly employed in embodiments of the present invention will be described. Then, characteristic processes of each embodiment will be described.

Figure 1A:
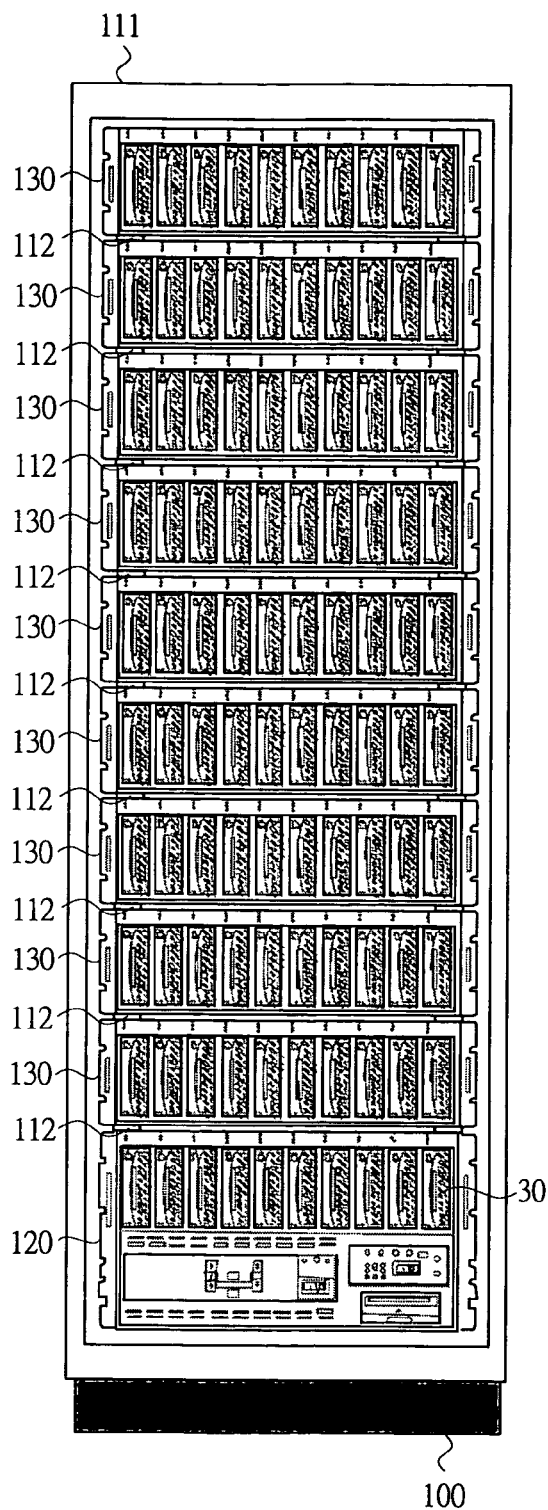
FIGS. 1A and 1B are the drawings showing the entire external appearance of the hardware configuration of a disk array system of an embodiment of the present invention.
Figure 1B:
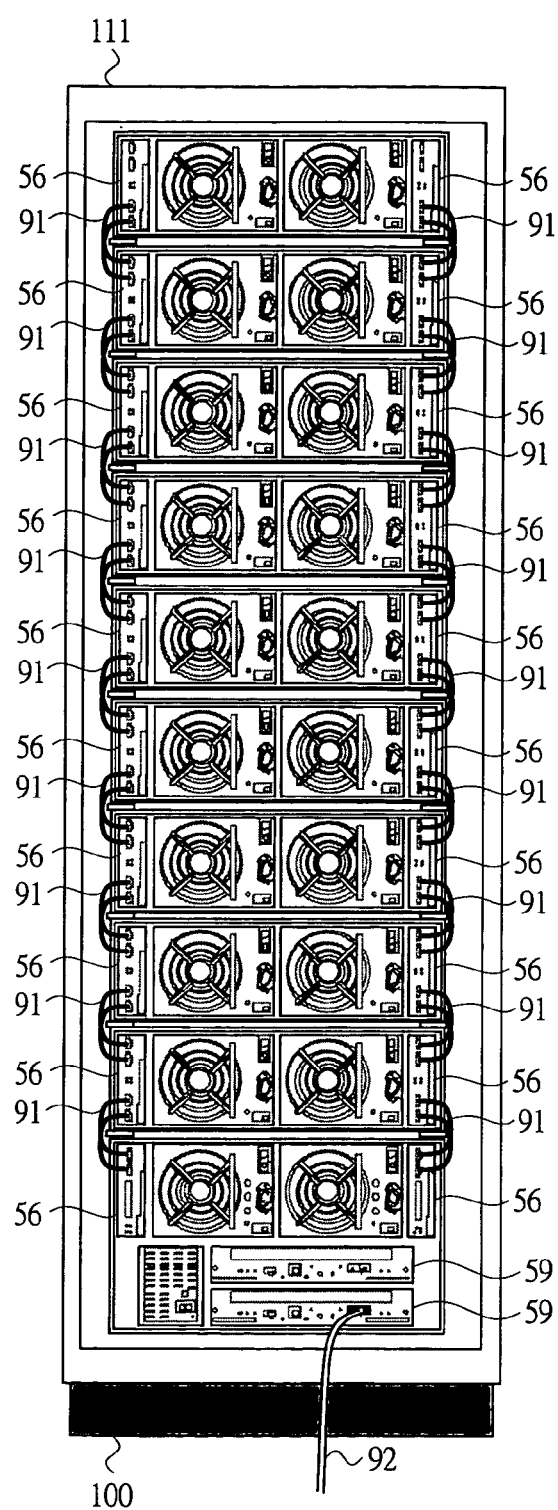

FIGS. 1A and 1B are the drawings showing the external appearance of the hardware configuration of a disk array system which is commonly employed as disk array systems of embodiments of the present invention. FIG. 1A shows the front of the system, and FIG. 1B shows the rear of the system. This disk array system 100 has a configuration in which a rack frame 111 serves as, a base, mount frames 112 are formed over a plurality of blocks in the vertical direction inside the rack frame 111, and a base chassis 120 (disk-array-control chassis) and additional chassis 130 (HDD chassis) are attached along the mount frames 112 in a manner that they can be pulled in and out. In this system 100, one base chassis 120 is attached to the lowest block and a plurality of additional chassis 130 can be attached to the upper blocks. Each of the chassis is equipped with boards (circuit boards) and units for providing various functions of this system 100. A base chassis 120 is a chassis for housing a controller board 59, etc. which form the controller 10 of the disk array system. The additional chassis 130 is a chassis for housing HDDs 30 and can be added in accordance with needs.

In the front of the system, there provided space to which the base chassis 120 and plural units of the additional chassis 130 which are loaded with HDDs 30 can be attached in a row. The HDDs 30 can be attached and detached at respective attachment locations. In addition, in the front of the base chassis, a battery unit serving as a backup power supply, a display panel for displaying the state of the system, a flexible disk drive for loading programs, etc. are provided.

In the rear of the system, power supply controller boards 56 and power supply units, etc. are provided in the base chassis 120 and the additional chassis 130. In the rear of the base chassis, controller boards 59, a cooling fan unit, etc. are provided.

A backboard is provided in each of the chassis for connecting the members, and each of the boards, units, a plurality of HDDs 30, etc. are connected to the backboard. The members communicate with one another via the wirings of the backboard.

The controller board 59 controls data storage to the HDDs 30 based on the instructions given from a data processing unit 300 which serves as a host. On the controller board 59, an interface for communicating with the host, a cache memory, a shared memory, an interface for communicating with HDDs 30, a circuits each having a function for the control by a RAID system and for monitoring the state of HDDs 30, etc. are mounted. The functions such as communication interface and cache memory may be mounted on another board which is separated from the controller board. In this configuration, two controller boards 59 are attached for redundancy in order to ensure the security regarding the control of the HDDs 30 in the base chassis 120.

In the interface provided in the controller 10 for communicating with the host, a SAN (Storage Area Network) formed by the Fibre Channel protocol, a LAN (Local Area Network) formed by a protocol such as Ethernet (registered trademark), or a connection adopting a predetermined standard such as SCSI is provided as an external connector for the connection with the host. The disk array system is connected with the data processing unit 300 via a communication cable 92 which is connected to the external connector.

The power supply controller board 56 connects the chassis and performs, for example, control of a system such as of power supply among chassis and control of the HDDs 30. Communication cables 91 are connected to the connectors of the power supply controller boards 56, and the power supply controller boards 56 are connected with one another by the communication cables 91. The power supply controller board 56 is communicably connected to the plurality of HDDs 30 in the chassis by a communication path which performs communication according to a protocol such as SATA. On the power supply controller board 56, in addition to a disk controlling unit which controls HDDs 30, for example, circuits which performs monitoring of the state of an AC/DC power supply, monitoring of the state of the HDDs 30, and control of power supply to the HDDs 30 are mounted. The various functions provided in the power supply controller board 56 may be provided in the controller board 59.

The power supply unit is equipped with an AC/DC power supply, etc., and supplies DC current to each of the members in the chassis, that is, to the HDDs 30 and the boards. The power supply unit is connected to the power supply controller board 56 and supplies power to each of the HDDs 30 according to the signals from the power supply controller board 56. In this configuration, two power supply controller boards 56 and two power supply units are attached for redundancy to each of the chassis in order to ensure the security regarding the power supply to the chassis.

The HDD 30 is a storage device equipped with, for example, a 3.5-inch contact-start-stop (CSS) magnetic disk or a 2.5-inch load/unload magnetic disk. The 3.5-inch magnetic disk has a communication interface such as SCSI1, SCSI2, SCSI3, FC-AL (Fibre Channel-Arbitrated Loop), parallel ATA, or serial ATA. Also, the 2.5-inch magnetic disk has a communication interface such as parallel ATA, or serial ATA. As an HDD 30 which is attached and connected to a chassis, the 2.5-inch magnetic disk and the 3.5-inch magnetic disk have differences not only in the communication interfaces thereof but also in I/O performance, power consumption, and lives thereof. The 2.5-inch magnetic disk has inferior I/O performance and shorter life when compared with the 3.5-inch magnetic disk, however, has an advantage in terms of the small power consumption.

In this embodiment, the HDD 30 is particularly an HDD compatible with serial ATA in which the sector length thereof is fixed and cannot be extended. The HDD is not limited to this and HDDs 30 of predetermined standards can be employed.

<System Configuration>

Figure 2:
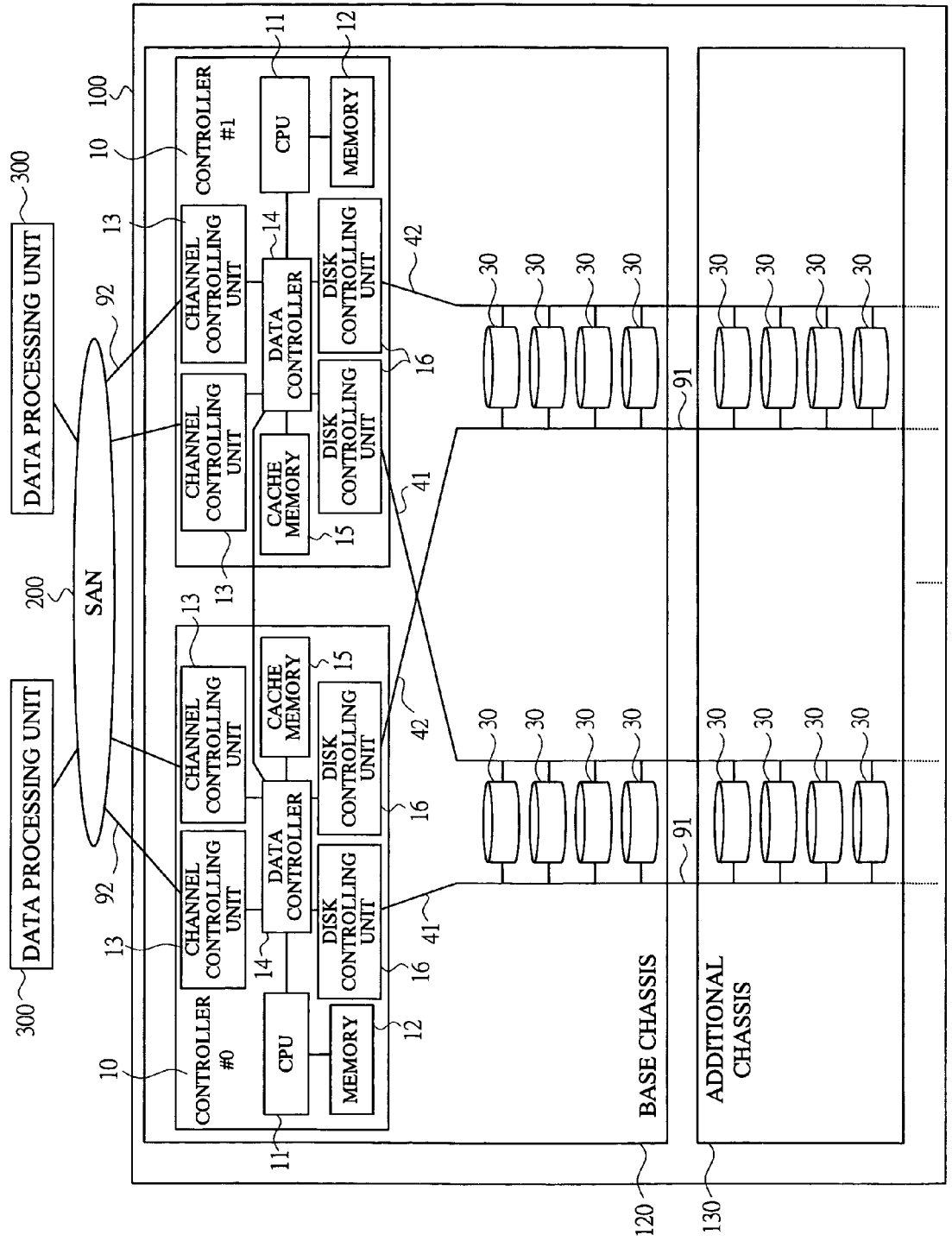
FIG. 2 is a functional block diagram of the entire system configuration relating to a disk array system of an embodiment of the present invention.

FIG. 2 is a functional block diagram of the entire system configuration relating to the disk array system 100. In the entire computer system configured by including the disk array system 100, the disk array system 100 and the data processing unit 300 serving as the host thereof are connected by an FC interface via a SAN (Storage Area Network) 200 and communication cables 92, etc. The connection with the host side is not limited to the SAN 200 and FC and can be formed by others.

The disk array system 100 has the controllers 10, HDDs 30, and connection units such as buses (communication lines) and ports for connecting them. Two controllers #0 and #1 are connected in the base chassis 120. The controllers 10 and other members are connected so as to have redundancy in the connection between the data processing unit 300, the controllers 10, and the HDDs 30.

In this configuration, each of the members such as the controller 10 and the HDDs 30 which is on the data path from the data processing unit 300 serving as a host to the HDDs 30 is duplicated. For example, even when failure occurs in one of the paths, the fail-over in which the process is continued by switching to the other path and the load distribution can be performed. The configurations of the duplicated members are approximately the same. The disk array system may be configured by a redundant configuration, which is not limited to such duplicated configuration.

The data processing unit 300 is, for example, a personal computer used by a user, a workstation, or a mainframe computer. The data processing unit 300 includes a program for utilizing the disk array system 100, and a communication interface which is compatible with FC and communicates with the disk array system 100. The data processing unit 300 issues a command (input/output request) to the disk array system 100, for example, for performing read or write of data from or to the storage area which is provided by the HDDs 30. The disk array system 100 reads and writes the data based on the accepted instruction given from the data processing unit 300.

Each of the controllers 10 has a CPU 11, a memory 12, channel controlling units 13, a data controller 14, a cache (cache memory) 15, and disk controlling units 16 and is mounted on the above described controller board 59. In this configuration, the channel controlling units 13 and the disk controlling units 16 are duplicated. Each of the controllers 10 is connected to the SAN 200 via the two channel controlling units 13. Two disk controllers 16 in each of the controllers 10 are connected to groups of HDDs 30 which are in two channels via interface buses. For example, one of the disk controlling units 16 in one of the controllers 10 is connected to HDDs 30 of one system via a communication line (bus) 41, and the other disk controlling unit 16 is connected to HDDs 30 of the other system via another communication line (bus) 42. Each group of the HDDs 30 is connected to both controllers 10 (disk controlling units 16). Even if the connection in one of the communication paths is faulty, the path can be switched to the other one so as to maintain the connection. The connection between chassis by the communication lines 41 and 42 corresponds to the above described communication cables 91.

The CPU 11 executes programs for performing controls of the controller 10 by the use of the memory 12 and realizes various functions of the controller 10. In the memory 12, various programs and data are stored and a control area described later is provided.

The channel controlling unit 13 is a communication processing unit which is connected to the SAN 200 and provides a communication function according to the FC protocol. The channel controlling unit 13 communicates with, for example, a communication processing unit of the host side and other disk array system. The channel controlling unit 13 is connected to the data controller 14 and reads or writes data from or to the cache (cache memory) 15.

The data controller 14 is an LSI which is connected to the CPU 11, the channel controlling units 13, the cache 15, and the disk controlling units 16 and performs data communication and data processing between the members. The data controller 14 performs read and write of processing data, particularly the data transferred between the controller and the host from or to the cache 15.

The cache 15 is used for storing the processing data, and particularly, the object data of addressing correctness check are temporarily held. For example, in the normal access, the channel controlling unit 13 stores write data or the like in the cache memory 15 via the data controller 14 in accordance with a data input/output request such as read or write given from the host. The disk controlling unit 16 executes input and output process to or from the cache memory 15 via the data controller 14 according to a command instructed from the CPU 11.

The disk controlling unit 16 is connected to the data controller 14 via a bus and processes the data input and output to or from the HDDs 30. The disk controlling unit 16 reads and writes data from or to the cache memory 15 via the data controller 14. The disk controlling unit 16 has a function to perform communication in accordance with serial ATA in the communication connection with the HDDs 30. All of the plurality of HDDs 30 are connected to each of the controllers 10 via the disk controlling units 16 and the communication lines 41 and 42.

<Connection Configuration Between Controller and Serial ATA-HDD>

Figure 3:
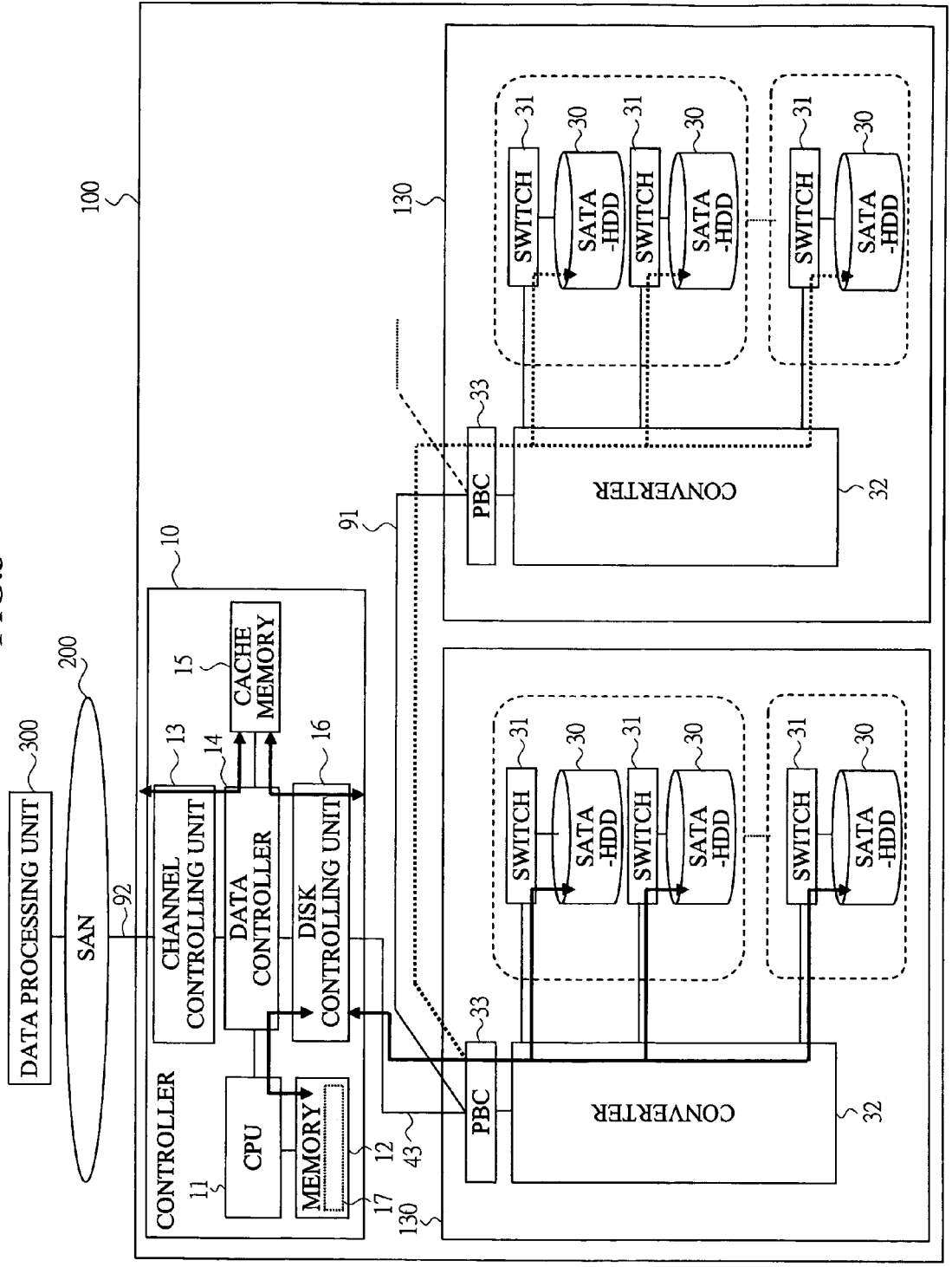
FIG. 3 is a diagram particularly showing the connection configuration between a controller and HDDs which are compatible with serial ATA and data path in the connection between the members as a configuration of a disk array system of an embodiment of the present invention.

FIG. 3 is a diagram particularly showing the connection configuration between the controller 10 and the HDDs 30 compatible with serial ATA (SATA) as a configuration of the disk array system 100. Also, the data paths in the connection between the members are represented by arrows. In the configuration shown in this diagram, the duplicated configuration, etc. shown in FIG. 2 are omitted.

A control area 17 is provided in the memory 12 in the controller 10. The data corresponding to the requests from the host such as read or write are stored in the cache memory 15 as shown by the arrows.

Each of the HDDs 30 which is attached and connected in each chassis is communicably connected to the disk controlling unit 16 via the communication line 43 which is compatible with the looped FC-AL system (topology).

The disk controlling unit 16 of the controller 10 is connected to each of the HDDs 30 via the communication line 43, a switch 31, a converter 32, a PBC 33, etc. The communication line 43 corresponds to the communication cable 91 which connects the chassis.

In the additional chassis 130, the PBC (port bypass circuit) 33 is switched so as to allow the port corresponding to each chassis to bypass in the communication line 41. The SATA-HDD 30 has a communication function compatible with SATA. The converter 32 is a unit which performs conversion processes between FC and SATA. The converter 32 and each of the SATA-HDDs 30 are connected via the switch 31. The connection of the HDD 30 can be cut by switching the switch 31.

As shown by the arrows in the diagram, in the connection between the controller 10 and the HDDs 30, the path between the HDDs 30 and processing units such as the CPU 11, the data controller 14, and the disk controlling units 16 is independent from the path for connecting between the above described processing units of the controller 10 and the control area in the memory 12. For example, this diagram shows the above described two paths centered on the disk controlling unit 16. For example, since the path is independent, even when the path between the data controller 10 and the HDDs 30 is not available due to the failure, etc., access can be made to the control area by the path between the data controller 10 and the control area, and the above described extracted data, etc. can be used.

Figure 4:
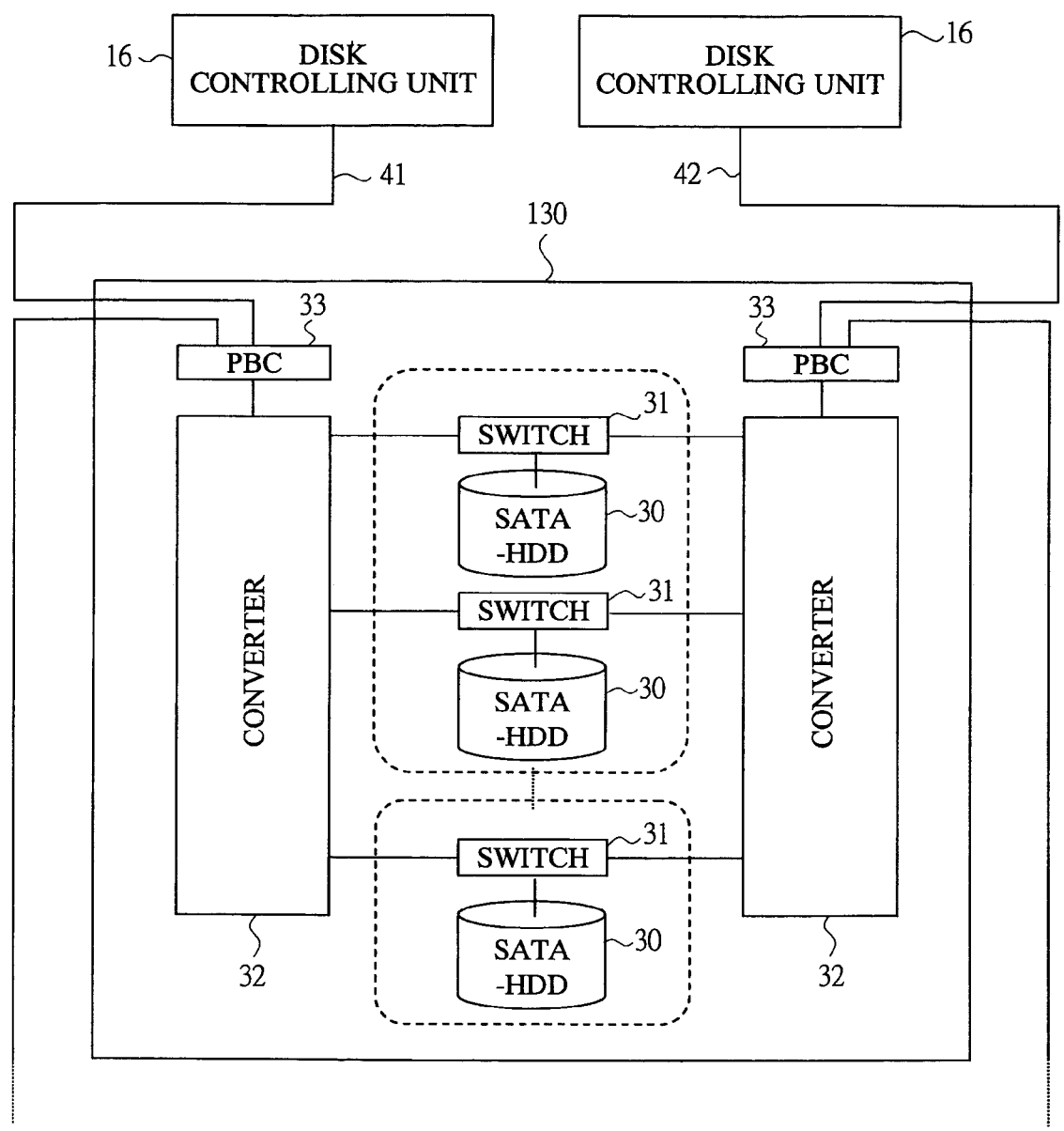
FIG. 4 is a diagram showing the connection configuration of a controller corresponding to a duplicated configuration and HDDs compatible with serial ATA as a configuration of a disk array system of an embodiment of the present invention.

FIG. 4 is a diagram showing the connection configuration of the controller 10 compatible with a duplicated configuration as shown in FIG. 2 and the HDDs 30 compatible with serial ATA. In the case of duplicated configuration, two disk controlling units 16 provided at the controller 10 are connected to the switch 31 of each SATA-HDD 30 via the communication lines 41 or 42, the PBC 33, and the converter 32, respectively.

<Allocation Configuration of Program and Data>

Figure 5:
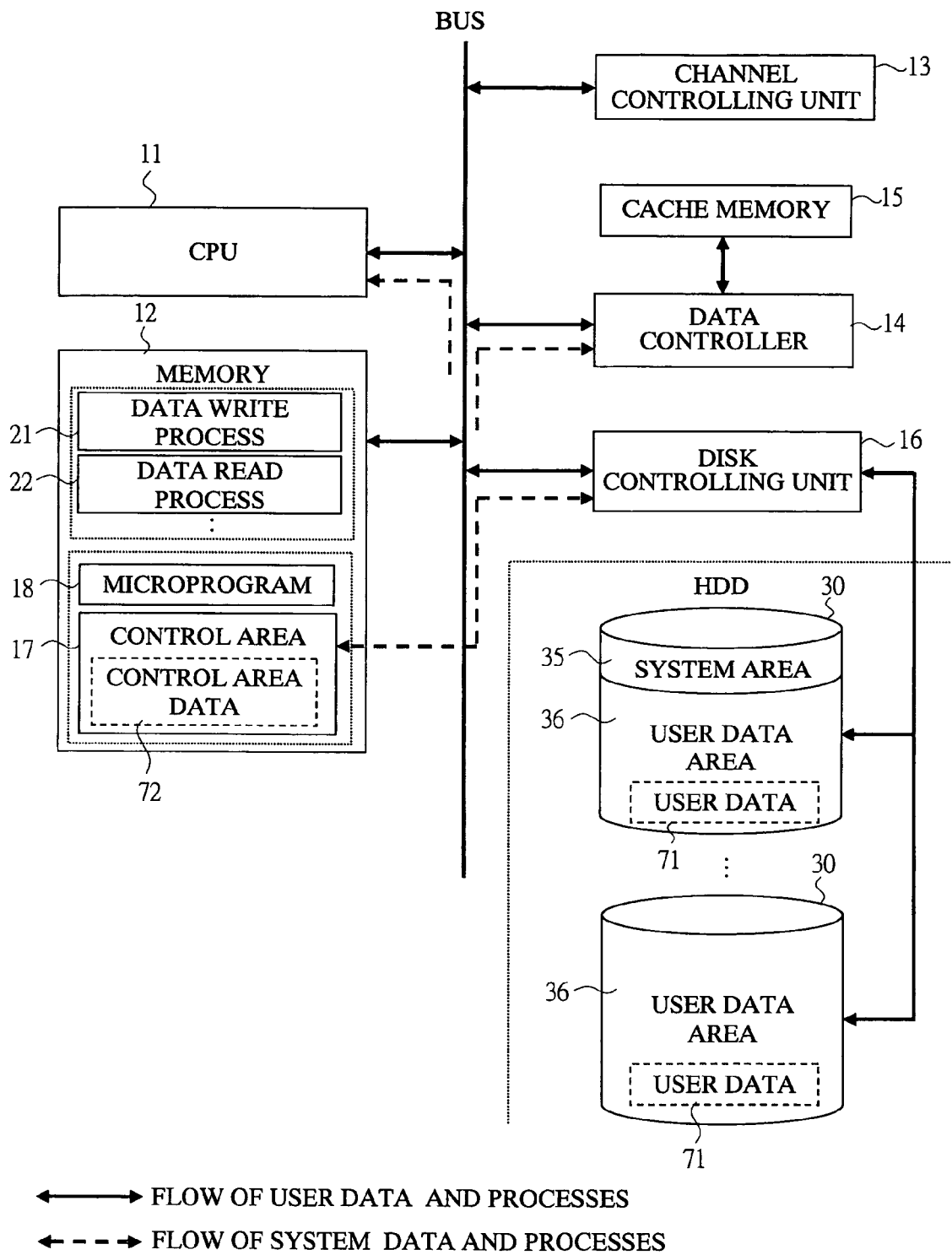
FIG. 5 is an explanatory diagram illustrating storage locations of a program and data and process flow between a controller and HDDs which are in a disk array system of an embodiment of the present invention.

FIG. 5 is an explanatory diagram showing process flow and storing locations of a program and data in the controller 10 and the HDDs 30 in the disk array system 100. The arrows of solid lines mainly represent the flow of user data 71 and the processes thereof. The arrows of broken lines mainly represent the flow of information and data (system data) including control area data 72 used in the system and the processes thereof. The diagram particularly shows the case where the disk controlling unit 16 accesses the memory 12 and the HDDs 30 in order to perform processes.

In the controller 10, a microprogram 18 which is executed by the CPU 11, etc. and the control area 17 are allocated in the memory 12. Also, programs and data relating to various processes such as data write process 21 and data read process 22 are allocated in the memory 12.

The microprogram 18 is a program for controlling the processes relating to the check of addressing correctness. The data write process 21 is a write process to the HDD 30 performed in response to a write request given from the host. The data read process 22 is a read process from the HDD 30 performed in response to a read request given from the host. The control area data 72 is stored in the control area 17. The control area data 72 are the check data, e.g., partly-extracted data and the check-code-embedded data, which are controlled by this check method.

The user data 71 given from the host side are received at the channel controlling unit 13 and stored in the cache memory 15 via the data controller 14. The user data given from the HDD 30 side are received at the disk controlling unit 16 and stored in the cache memory 15 via the data controller 14.

In the storage area of the HDD 30, a system area 35 for storing system data and a user data area 36 for storing the user data 71 are reserved in accordance with needs. The user data 71 are the object data for ensuring the data reliability thereof by this check method.

In the data write process 21, the disk controlling unit 16 performs a process in which the user data 71 are transferred from the cache memory 15, etc. to the user data area 36 in the HDD 30 so as to write it therein. Also, in the data read process 22, it performs a process in which the user data 71 are read from the user data area 36 in the HDD 30 so as to transfer it to the cache memory 15, etc. In the read and write processes, the physical address (LBA) of the location in the HDD 30, which serves as the object of the access, is obtained by address conversion of the object data performed by the disk controlling unit 16, etc.

The read and write of the control area data 72 are performed by accessing the control area 17 in the memory 12 via buses from processing units such as the CPU 11, the data controller 14, and the disk controlling unit 16. The control area 17 can be accessed faster than the HDD 30 side from the disk controlling unit 16, etc.

As described later, the area for the control area 17 may be provided in the system area 35 of the HDD 30. When the control area 17 is provided in the system area 35, the disk controlling unit 16 similarly reads and writes the control area data 72 from or to this area.

<Example of RAID Control>

Figure 6:
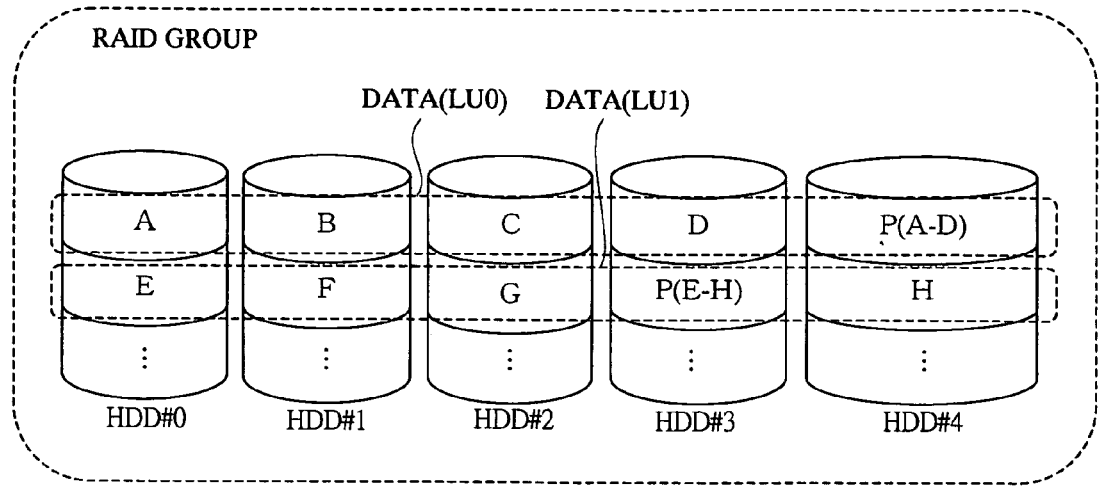
FIG. 6 is a diagram showing an example state in which data are stored in HDDs which form a RAID group as an example of RAID control in a disk array system of an embodiment of the present invention.

FIG. 6 is a diagram showing an example state in which data are stored in the HDDs 30 which form the RAID group as an example of RAID control in the disk array system 100. The disk array system 100 has a function to perform the RAID 5 control, in which the user data is subjected to striping and a parity process so as to input or output the data to or from the HDDs 30. For example, it is assumed that five physical HDDs 30, HDDs #0 to #4 connected to the disk array system 100 are provided. The group of the HDDs #0 to #4 forms a RAID group. A logical data unit (LU), for example, LU0 and LU1 relating to the RAID control are set on the RAID group. For example, a RAID group and LUs compatible with RAID 5 are set. The LU is a processing data unit compatible with the RAID 5 control. The LU0 consists of data {A, B, C, D, and P (A-D)}. Each of the data A to D and P is the striping data with a predetermined size. Particularly, P (A-D) represents the parity (parity data) of the data A to D. Herein, the HDDs #0 to #3 for storing the data A to D are data disks, and the HDD #4 for storing the parity data P is a parity disk. Similarly, the LU1 consists of data {E, F, G, P (E-H), and H}, and is the data having the parity storing locations shifted from those in the LU0. In the RAID 5 control, the controller 10 (particularly, the disk controlling unit 16) performs a striping (separation) process and a parity generation/addition process for the user data given from a host, and then writes the (non-parity) data and the parity in parallel into the group of the HDDs 30. The controller 10 (particularly, the disk controlling unit 16) reads the (non-parity) data and the parity in parallel from the LUs on the group of the HDDs 30, checks (parity check) whether the data is correct or not by the use of the parity, and provide the correct restored data to the host.

Since processes such as data striping by the RAID control are independent from the processes of this check method, the order for performing the processes may be arbitrary. In this embodiment, in the write process, the striping and parity processes, etc. are performed and then processes of this check method are performed by selectively employing the striping data as the object.

In the check method of the first embodiment, processes for checking the addressing correctness are performed for particularly all disks in the plurality of HDDs 30, that is, each striping data (data and parity) in the RAID group. Meanwhile, in a check method of the later-described sixth embodiment, processes for checking the addressing correctness are performed for particularly some of the disks in the plurality of HDDs 30, that is, part of the data in the striping data in the RAID group, for example, only the parity data.

<Processing Data Units>

Figure 7:
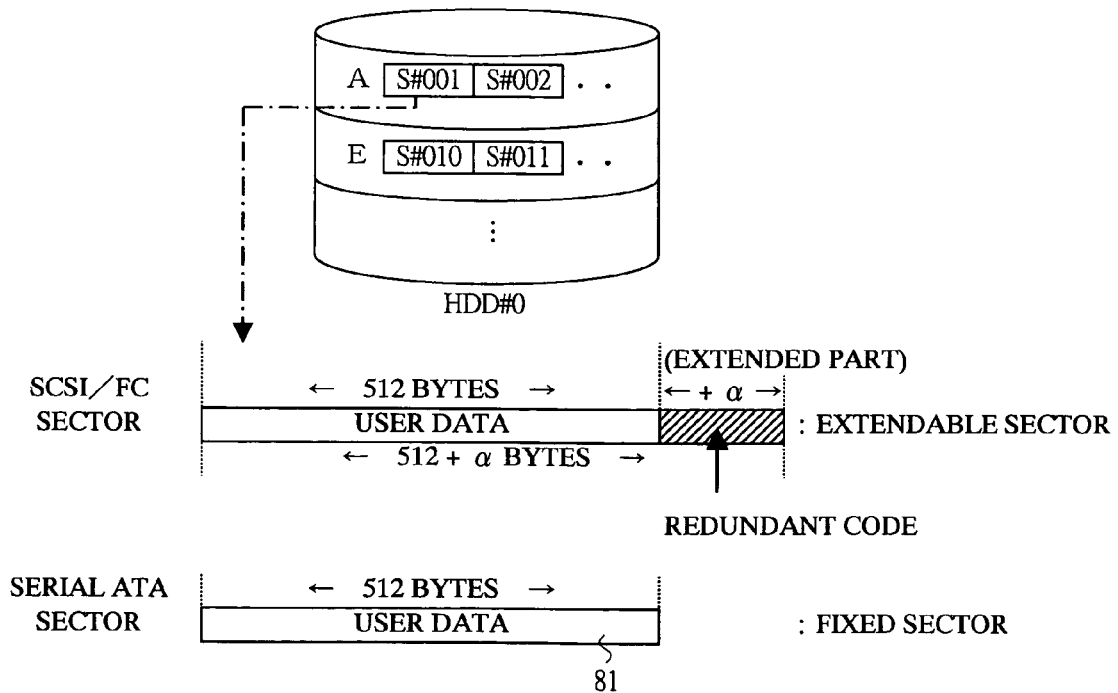
FIG. 7 is a diagram showing a state of a disk array system of an embodiment of the present invention, in which blocks which are the units of processing data in the processes of this check method are stored in one HDD.

FIG. 7 is a diagram showing a state where the blocks which are the units of processing data in the processes of this check method are stored in one HDD 30 according to the configuration shown in FIG. 6. A block 81 which serves as a unit of processing data in this embodiment corresponds to 1 sector (512 bytes) which is a storage area unit in the SATA-HDD 30.

The above described striping data A and E are stored in the above described HDD #0. The striping data A are further divided into a plurality of blocks 81 so as to be controlled. For example, the data A consist of a plurality of blocks 81, {S#001, S#002 . . . }. Similarly, the data E consist of a plurality of blocks 81, {S#010, S#011, . . . }.

One block 81 is shown in the lower side of the diagram. The diagram shows a case employing an HDD compatible with SCSI or FC and a case employing the SATA-HDD 30. When the HDD is compatible with SCSI or FC, the sector length (block length) can be extended. When a sector length is extended in a data format, in the extended sector, an extended part ($\alpha$ bytes) is attached to the sector length (512 bytes) before the extension. When the check is performed by a method in which a redundant code is added to the user data, for example, the redundant code ($\alpha$ bytes) is recorded in the part extended in respect to the user data part (512 bytes). On the other hand, in a case of the SATA-HDD 30, the sector length thereof is fixed and cannot be changed. The fixed sector has a fixed sector length (512 bytes) In the access from the controller 10 to the HDD 30, the data read and write are performed in units of sector in the HDD 30.

Unlike the conventional art, in this check method, even when an HDD 30 compatible with the serial ATA in which sector length cannot be changed is employed, addressing-correctness check is executed by associating (e.g., embedding) the redundant code (check code) with the data. This check method can be executed regardless whether the sector length can be changed or not.

<Check Method>

Figure 8:
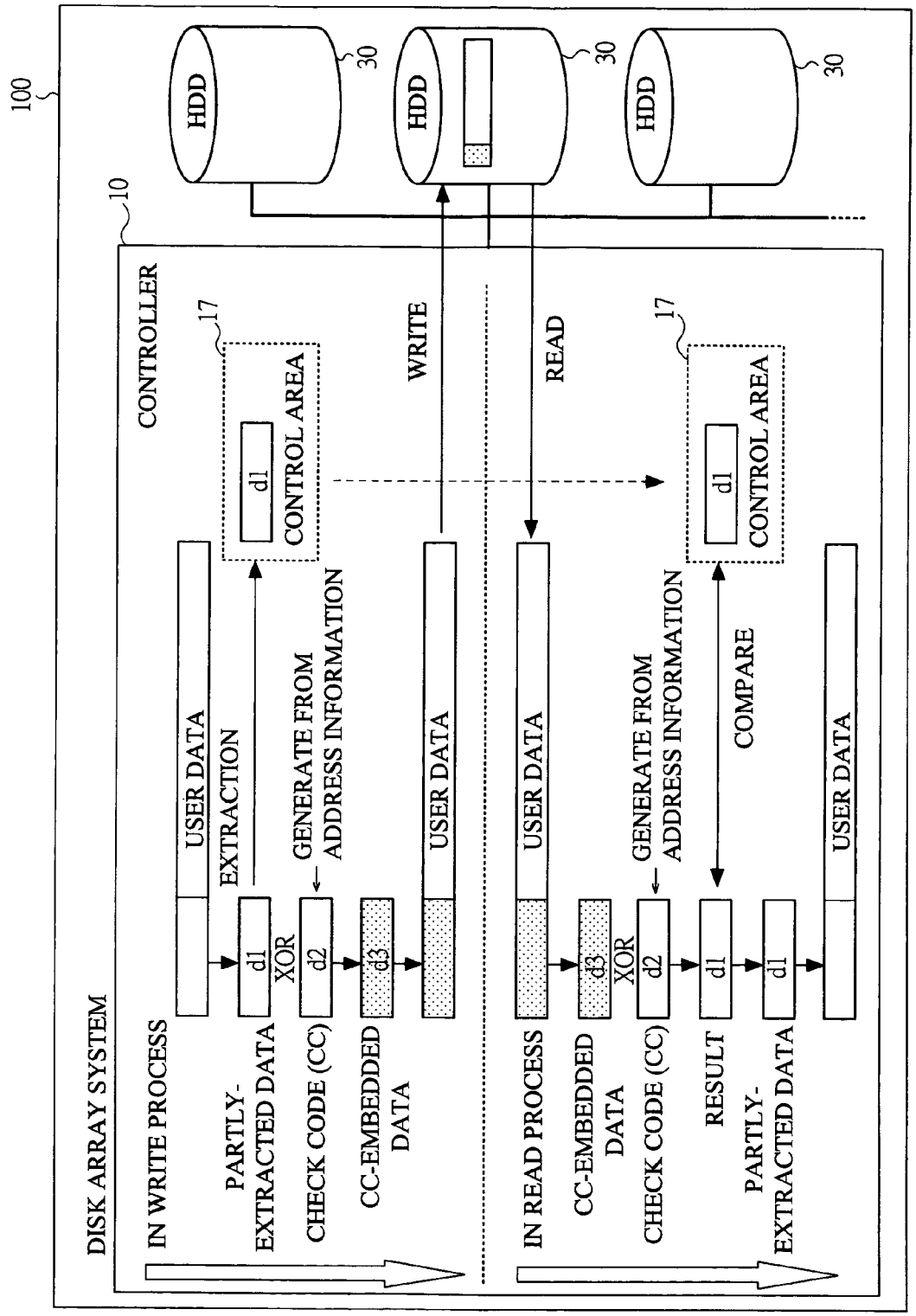
FIG. 8 is an explanatory diagram showing the general outline of processes of a check method which are performed in a disk array system of a first embodiment of the present invention.

FIG. 8 is an explanatory diagram showing the general outline of processes of a check method employed in the disk array system of the first embodiment. When the object user data is written to the HDD 30, the controller 10 extracts a part of the data, stores the partly-extracted data d1 in the control area 17 side, and performs an XOR operation with the check code (CC) d2 which has been generated by calculations of address information, etc. of the access object. Then, the CC-embedded data d3 which have been obtained by the operation are returned to the extracted location of the object user data, and the data are written to the HDD 30. When the object user data are read from the HDD 30, the controller 10 fetches a part corresponding to the CC-embedded data d3 from the data, the fetched data are subjected to an XOR operation with the check code (CC) d2 which has been generated by calculations of address information of the access object, and the operation-resultant data and the partly-extracted data d1 which have been stored in the control area 17 are compared and collated so as to check the addressing correctness. When it is correct, the operation-resultant data are identical to the partly-extracted data d1 in the control area 17 side. The user data are restored by returning the normal partly-extracted data d1 to the original location.

Figure 9:
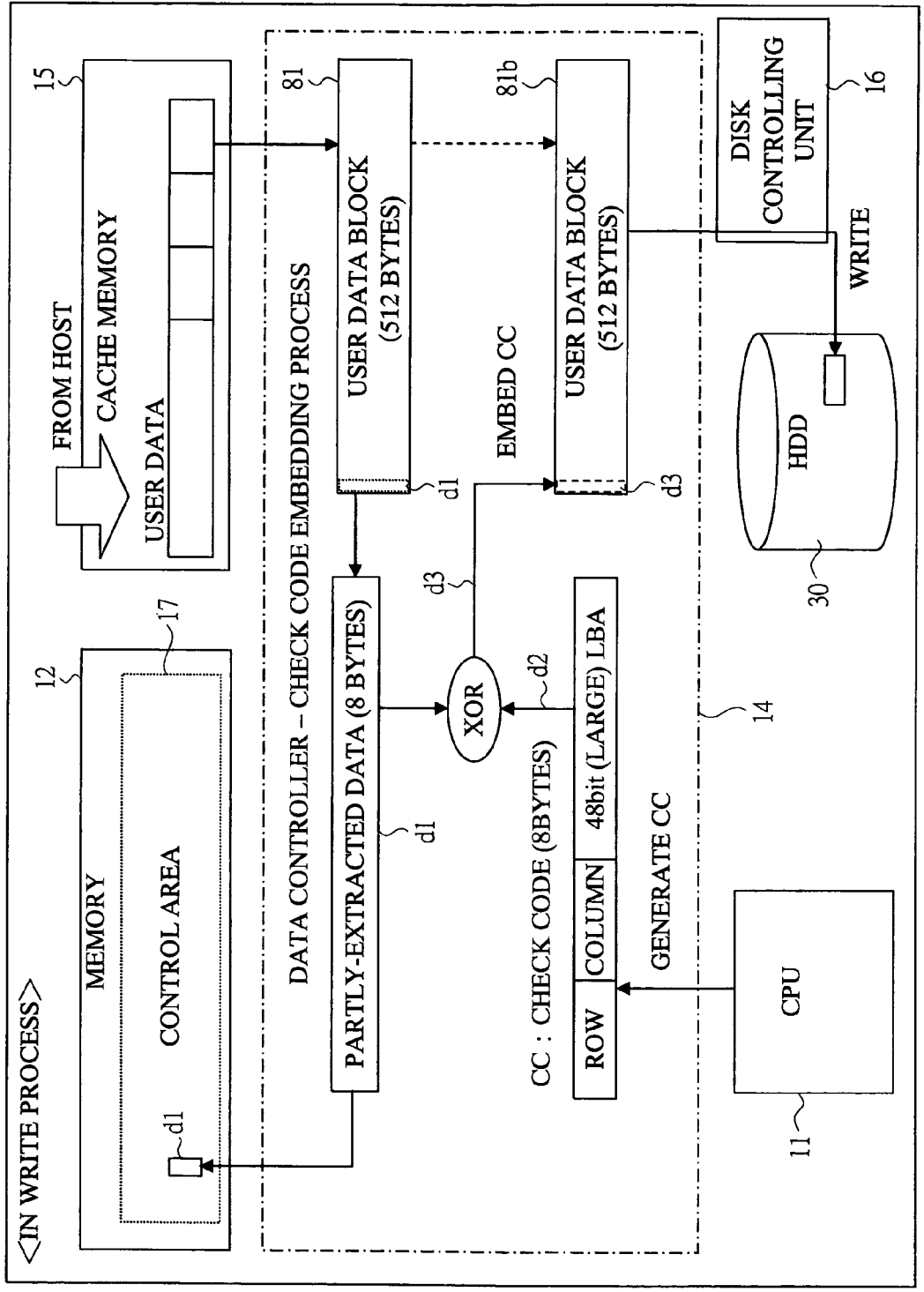
FIG. 9 is an explanatory diagram showing a model of a check code embedding process performed in a process for writing data to the disk according to the check method in the disk array system of the first embodiment of the present invention.
Figure 10:
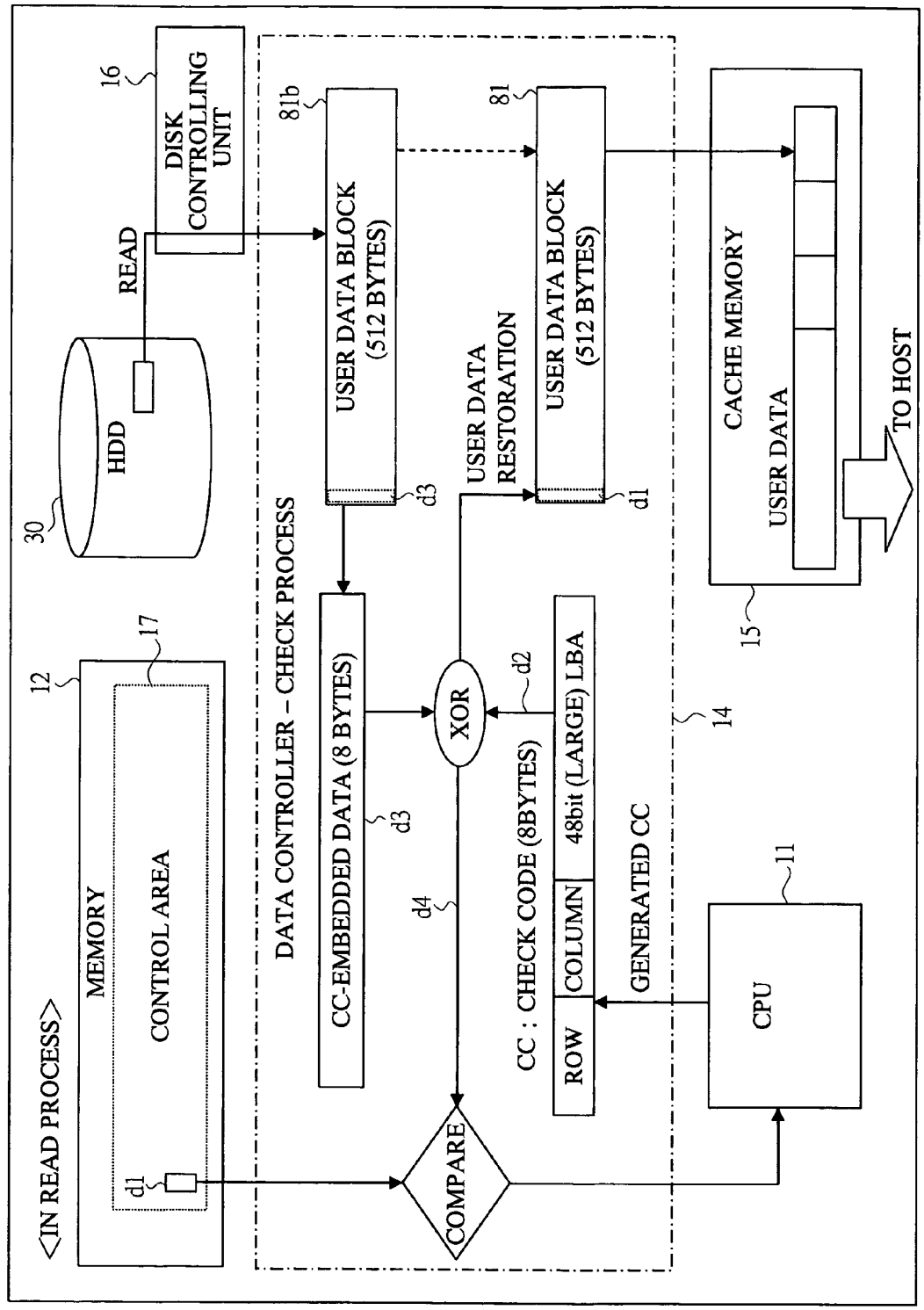
FIG. 10 is an explanatory diagram showing a model of a check process performed in a process for reading data from the disk according to the check method employed in the disk array system of the first embodiment of the present invention.

FIG. 9 and FIG. 10 are explanatory diagrams showing the model processes of a write process and a read process in the check method which is employed in the disk array system of the first embodiment. FIG. 9 shows a check code embedding process performed in a process for writing data to a disk, and FIG. 10 shows a check process performed in a process for reading data from a disk. Particularly, the diagrams show the cases where the processes are performed in the disk array system based on the acceptance of data input/output requests given from the host mainly by the data controller 14 by employing the user data as the object data.

In this check method, processes are performed for checking the addressing correctness of the data access to the HDD 30. In this check method, a process (check code embedding process) is performed as a first process, in which in the write process to the HDD 30, a check code (CC) is embedded in a part of the object data, and the above described data part and the check-code-embedded data are stored in different areas as the check data which are employed as check object in the read process. As a second process, a process (check process) is performed, in which in the read process from the HDD 30, with respect to the object data, the check-code-embedded data and the above described data part of the object data are fetched, the check-code-embedded data are subjected to an operation with the check code, and they are compared and collated so as to check the addressing correctness.

In FIG. 9, in the write process, the controller 10 performs a check code embedding process for the object data which are to be written to the HDD 30. First, the user data or the write data (object data to be stored in the HDD 30), which have been accepted in accordance with a write request from the host, are temporarily stored in the cache memory 15 of the controller 10. The channel controlling unit 13 receives the write data from the host and stores the data in the cache memory 15.

The data controller 14 performs the processes for each block 81 of the user data each having a size of 512 bytes by a program of a check code embedding process. The process can be performed by executing a microprogram 18 by a processing unit such as the CPU 11, the data controller 14, or the disk controlling unit 16; or performed by a circuit or the like provided exclusively for this process.

In the check code embedding process, the data controller 14 extracts a part of the data employed as the object of check code embedding from the block 81 of the user data. Herein, 8 bytes of data are employed as the partly-extracted data d1. The location and the size for extracting the data part, which is employed as the object of the check code embedding process from the block 81 can be set arbitrarily. For example, they are determined based on the setting of the microprogram 18. For example, the extraction location is the head of the block 81, and the extraction size is 8 bytes.

The data controller 14 stores the data d1, which have been partly extracted from the block 81, as the above described control area data 72 in the control area 17 in the memory 12. The above described first and second check data are associated, for example, by the address information indicating the data storing location in the HDD 30.

The data controller 14 or the CPU 11 generates the check code (CC) d2 by a predetermined method. For example, it is assumed that the CPU 11 generates the check code d2. The CPU 11 generates the check code d2 by calculations based on the address information indicating the access location (write access location) of the object data in the HDD 30. In this embodiment, the address information of the object block 81 in the HDD 30 is employed as the check code d2. For example, 8-byte data consisting of 16 bits of HDD location information (POW and COLUMN) and 48 bits of LBA are employed as the address information. The above described HDD location information is the information for identifying the access object HDD in the arrangement of a plurality of HDDs 30 which are connected to the system in accordance with the RAID configuration. The above described LBA is the information for identifying the storage area (sector) of the access object in the access object HDD 30. The information employed for generating the check code d2 and the generated check code d2 are not limited to the above described address information as long as they are identical in the read and write of the object data and are determined to be unique. It must be noted that the check code is the information different from parity.

Note that the term LBA mentioned here is the information employed in a SCSI system and is a value (for example, 48 bits) for identifying the location of the storage area unit (sector) in an HDD. The LBA can be referenced to by, for example, an address counter in the program of the disk array system. The information compatible with the system of the address or the identifying information in the disk array system other than the LBA is employed as the data for generating the check code or as the check code itself.

The data controller 14 performs an XOR operation with the data d1 which have been extracted from the block 81 in order to embed the generated check code d2 therein. Then, the operation-resultant data d3 generated by the XOR operation of the partly-extracted data d1 and the check code d2 are returned to the originally extracted location in the block 81. The operation-resultant data (referred to as CC-embedded data) d3 are returned to the block 81 and attains the state of block 81b. Consequently, the check code d2 is embedded in the block 81 of the user data.

The CC-embedded data d3 are the object data (referred to as check data) to be subjected to a check process in the read process together with the partly-extracted data d1. Particularly, the check data stored in the HDD 30 side is referred to as first check data, and the check data stored in the control area 17 side are referred to as second check data. In this embodiment, the first check data are the above described CC-embedded data d3, and the second check data are the above described partly-extracted data d1. The above described process is the check code embedding process for one block 81.

The controller 10 collects the plurality of blocks 81b after the above described check data are created and writes them to the access object HDD 30 as processed user data. That is, the disk controlling unit 16 transfers the user data to the object HDD 30, and writes the data to the object area specified by the LBA in the HDD 30. When the controller 10 performs RAID control such as the above described striping and parity processes, the striping data are transferred to respective HDDs 30 which form a RAID group, and the data are written to the storage area thereof.

In FIG. 10, in the read process, the controller 10 performs a check process (addressing-correctness check process) for the object data read from the HDD 30. By the above described write process, the user data consisting of the blocks 81b including the first check data (CC-embedded data d3) are stored in the HDD 30. The second check data (partly-extracted data d1) are stored in the control area 17 in the memory 12 so as to correspond to each of the blocks 81b.

The controller 10 performs a check process by a check-process program for each block 81b of the object data. The process can be performed by executing a microprogram 18 by the CPU 11 or performed by a circuit or the like which is provided exclusively for this process.

In the check process, the data controller 14 fetches the part in which the check code d2 is embedded, i.e. the CC-embedded data d3 (first check data) from the block 81b which has been read from the HDD 30 by the disk controlling unit 16.

Also, the data controller 14 fetches the partly-extracted data d1 (second check data) corresponding to the object block 81b from the control area data 72 which are stored in the control area 17 in the memory 12.

The data controller 14 or the CPU 11 generates the check code (CC) d2 by a predetermined method. For example, it is assumed that the CPU 11 generates the check code d2. The CPU 11 generates the check code d2 by calculations based on the address information indicating the access location (read access location) of the object data in the HDD 30. This address information is identical to the address information employed in the above described write process.

The data controller 14 performs an XOR operation between the CC-embedded data d3 (first check data) and the generated check code d2. Then, the operation-resultant data d4 which have been generated by the XOR operation between the CC-embedded data d3 and the check code d2 are compared and collated with the partly-extracted data d1 (second check data) stored in the control area 17. The data controller 14 recognizes the result of the addressing correctness check by comparing the values of the above described two data d3 and d2. That is, when the above described values match, the operation-resultant data d4 are identical to the partly-extracted data d1 (second check data), thereby the addressing of the object data is confirmed to be correct. When the above described values do not match, the operation-resultant data d4 are different from the partly-extracted data d1 (second check data), thereby the addressing of the object data is confirmed to be abnormal.

When the data controller 14 confirms that the addressing is correct, the data controller 14 restores the state of the block 81 by returning the normal read data to the fetching location in the original block 81b. Meanwhile, when the controller 14 confirms that the addressing is abnormal, the data controller 14 performs corresponding processes such as addressing error notification to the CPU 11. The above described process is the check process for one block 81.

The controller 10 collects the plurality of blocks 81 after the above described check process and stores them in the cache memory 15 as processed user data. That is, the disk controlling unit 16 transfers the user data to the cache memory 15. The processed user data which are the read data to be the response to the read request from the host are temporarily stored in the cache memory 15. The channel controlling unit 13 reads the read data from the cache memory 15 and transmits the data to the host.

According to the above described process, a check employing a check code can be performed regardless of the sector format used in the HDD 30. Therefore, even if an HDD 30 compatible with SATA, etc. in which sector length is fixed and a method of simply adding redundant code to user data cannot be employed is used, the data reliability equivalent to the cases employing HDDs which are compatible with SCSI or FC can be ensured.

The units of processing data (blocks 81) and the data (check data) which are stored in the control area 17, etc. may be set according to required data units, such as the sector (block) units in the HDD 30, the cluster units in the OS of the disk array system 100, and the stripe units of a RAID system.

As another process example of the check code d2, each of the address information and the control code (data for controlling the processes in this check method) may be allocated and embedded as the check code d2 to the data d1 which have been partly extracted from the object data. For example, when 8 bytes of data are extracted as the partly-extracted data d1, a process in which 4 bytes are allocated and embedded to the address information and 4 bytes are allocated and embedded to the control code is performed.

Figure 11:
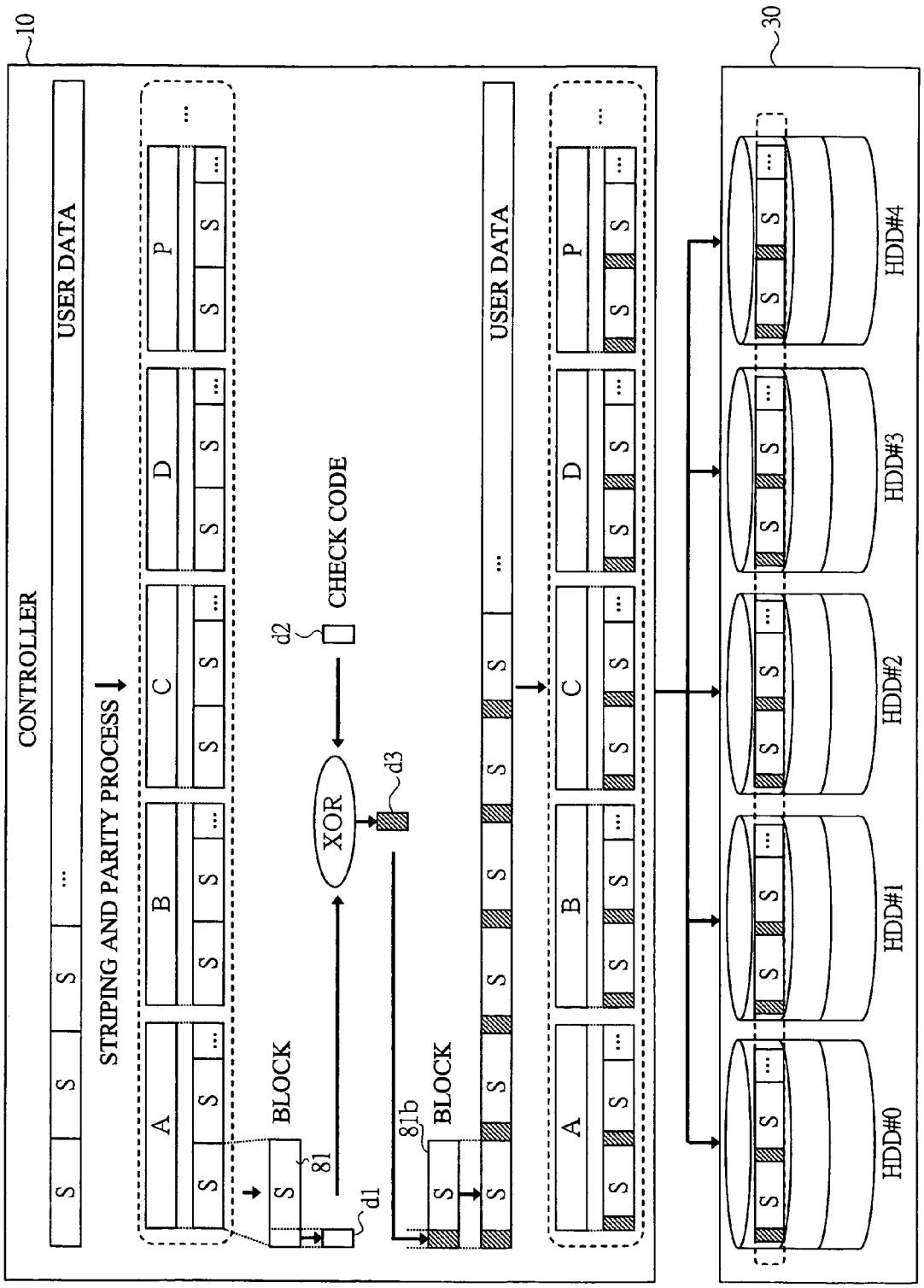
FIG. 11 is an explanatory diagram summarizing the relationship of processing data in the case where striping, a parity process and a check code embedding process are performed for the object data in accordance with RAID 5 control in the disk array system of the first embodiment of the present invention.

FIG. 11 is an explanatory diagram summarizing the relationship of processing data in the case where striping, a parity process and a check code embedding process for the object data are performed in accordance with the RAID 5 control in the first embodiment. The diagram shows the case where the user data after the striping and parity process are subjected to the check code embedding process in the configuration of a RAID group corresponding to that shown in FIG. 6. In the diagram, S denotes one block 81. The user data is subjected to striping and the parity process by the controller 10, and each of striping data {A, B, C, D, and P} forming one LU are created. P denotes parity. The controller 10 performs above described check code embedding process for each block 81 (S) which forms the striping data. Each of the striping data is reconfigured by the processed block 81$b$ (S). The striping data including the processed block is subjected to a write process by the controller 10 to the corresponding group of HDDs 30, #0 to #4.

FIG. 12 is an explanatory diagram illustrating the principle of the addressing correctness check of the first embodiment. The diagram shows variations of the formula relating to the XOR operation in the case where the data is normal (the addressing of the data access is correct). First, in the write process (in a check code embedding process), an XOR operation is performed between the data d1 (data A) which have been extracted partly from the block 81 of the user data and the generated check code d2 (data B), and the CC-embedded data d3 (data C) are created as a result of the operation. The partly-extracted data d1 (data A) and the CC-embedded data d3 (data C) serve as the check data, and the CC-embedded data d3 are stored as the first check data in the HDD 30 side, and the partly-extracted data d1 are stored as the second check data in the control area 17 in the memory 12, which is the area separated from the HDD 30. The XOR operation upon the check-code embedding is as the following formula (1).

$$C = A\ XOR\ B \quad (1)$$

Meanwhile, in the read process (in a check process), the first check data are fetched from the user data block 81$b$ which has been read from the HDD 30. The partly-extracted data d1 (data A) which are the second check data are fetched from the control area 17 side. At this time, the data contents have not been identified to be correct since the correctness has not been checked. An XOR operation is performed between the data (if normal, data C) which have been read as the first check data and the generated check code d2 (data B), and the data (if normal, data A) are created as the result of the operation.

When the data in a read process are normal, the XOR operation is as the following formula (2). The formula (2) is a variation of the formula (1).

$$C\ XOR\ B = A\ XOR\ B\ XOR\ B = A\ XOR\ 0 = A \quad (2)$$

As shown in the formula (2), when the addressing of the read access is correct, the result of the XOR operation in the check process is data A. Therefore, when the operation-resultant data are compared with the data A which are the second check data stored in the control area 17 and the values thereof are identical, the correctness of the addressing is confirmed, i.e. the data are confirmed to be normal.

FIG. 13 is an explanatory diagram illustrating specific operation examples relating to the check method of the first embodiment. First, in a check code embedding process in the write process, the CC-embedded data d3 are created by an XOR operation between the data d1 which have been extracted partly from the block 81 of the user data and the check code d2. For example, the diagram shows the case where the partly-extracted data d1 are "AAAAAAAA" (hexadecimal number) of 4 bytes and the check code d2 is "00000001". As a result of the XOR operation of the both data, the operation-resultant CC-embedded data d3 become "AAAAAAAB". The CC-embedded data d3 are stored in the HDD 30 side as the first check data, and the partly-extracted data d1 are stored in the control area 17 side as the second check data.

In a check process in the read process, an XOR operation is performed between the first check data (CC-embedded data d3) which have been fetched from the data read from the HDD 30 and the check code d2, and the operation-resultant data d4 are compared with the second check data (partly-extracted data d1) in the control area 17. This diagram shows a check process regarding the partly-extracted data d1 which are identical to that in the above described write process. When the addressing is correct, the data fetched from the read data as the first check data are the above described CC-embedded data d3. In this case, by an XOR operation with the check code d2, the operation-resultant data d4 becomes "AAAAAAAA" and the value thereof is identical to the partly-extracted data d1 which have been stored in the control area 17. Meanwhile, when the data fetched as the first check data are, for example, "ABAAAAAA" because of an abnormal addressing, the operation-resultant data d4 of the XOR operation with the check code d2 becomes "ABAAAAAB" and the value does not match with that of the partly-extracted data d1 which have been stored in the control area 17.

<Entire Flow>

Figure 14B:
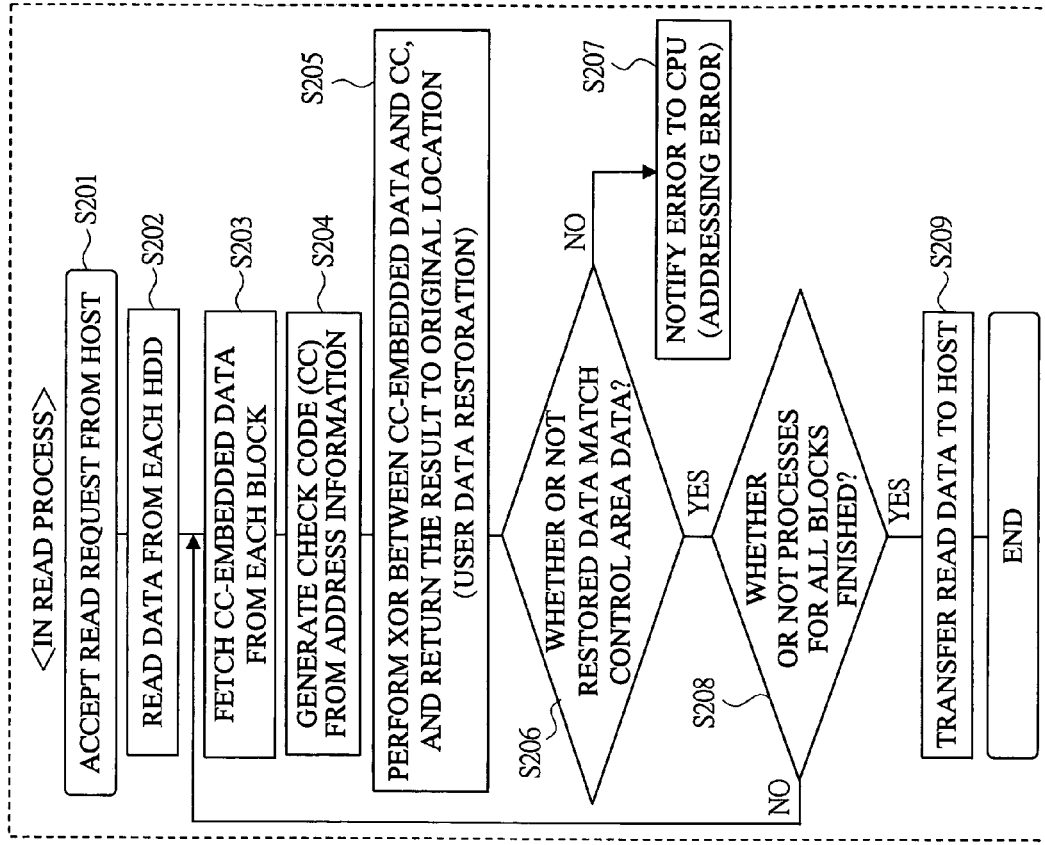
FIGS. 14A and 14B are flow diagrams of the processes performed by a controller according to the check method which is employed in the disk array system of the first embodiment of the present invention.
Figure 14A:
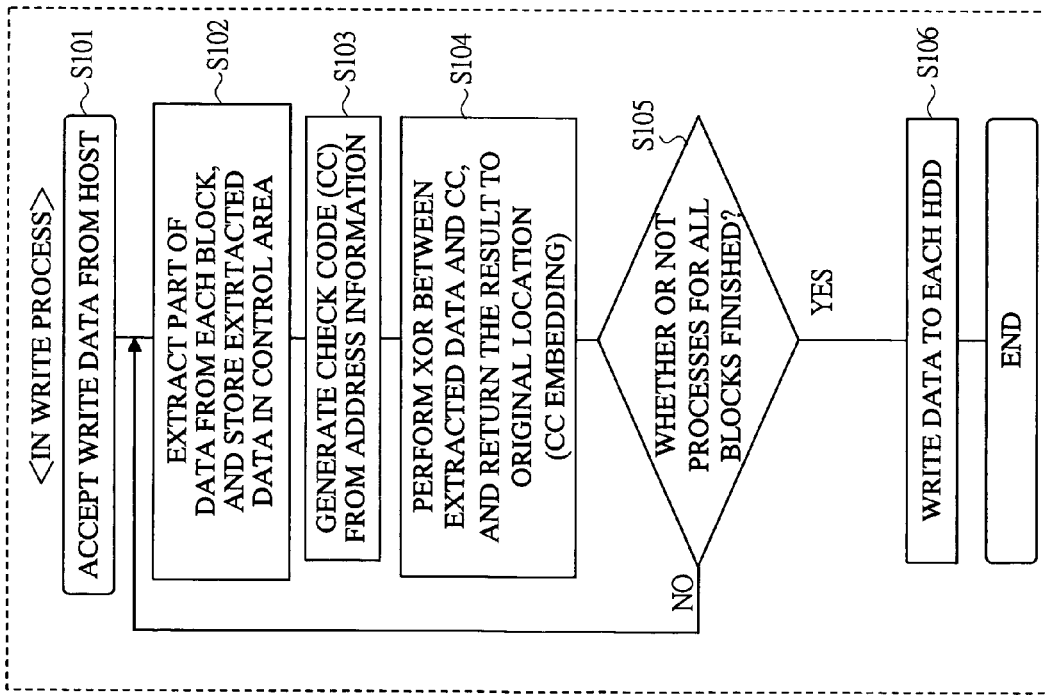

FIGS. 14A and 14B are flow diagrams of the processes performed by the controller 10 in the check method employed in the disk array system of the first embodiment. In the first embodiment, the above described first and second processes are performed for all disks of the plurality of HDDs 30. The diagrams particularly show the processes in the cases where the data controller 14 in the controller 10 is a main process executor. The left side (14A) shows the processes (including the above described first process) in the disk write, and the right side (14B) shows the processes (including the above described second process) in the disk read. The CPU 11 or the disk controlling unit 16 can be the main process executor for executing the processes described below in the same manner.

In the disk write shown in FIG. 14A, first, the controller 10 accepts write data from the host (S101). The write data are received by the channel controlling unit 13 and stored in the cache memory 15. The controller 10 extracts a part of the write data from each block 81 thereof, and the partly-extracted data d1 are stored in the control are 17 in the memory 12 as the second check data (S102).

The controller 10 generates the check code d2 of the write data based on the address information, i.e. the data of the access-object HDD location and LBA (S103). The controller 10 performs an XOR operation between the partly-extracted data d1 and the generated check code d2, and the operation-resultant CC-embedded data d3 are returned to the original location (extraction location) in the block 81 as the first check data (S104).

The controller 10 judges whether the above described processes (check code embedding processes) of all blocks 81 in the object write data have been completed or not while repeating the process for each of the blocks 81 (S105). After the processes of all blocks 81 have been completed, the controller 10 performs a data write process in which the processed write data are transferred and written to the write object HDD 30s, for example, to the HDDs 30 corresponding to a RAID group (S106).

In the disk read shown in FIG. 14B, first, the controller 10 accepts a read request from the host (S201). The controller 10 performs a data read process of the object user data 71 for the read object HDDs 30, for example, HDDs 30 corresponding to a RAID group (S202). By the data read process, the user data 71 are read from the HDDs 30 and the read data are stored in a predetermined work memory. The memory is any of the storage areas provided in the controller 10.

The controller 10 fetches the CC-embedded data d3 (first check data) from each of the blocks 81b of the read data (S203). The controller 10 generates the check code d2 based on the data of the access-object HDD location and LBA (S204). The controller 10 performs an XOR operation between the fetched CC-embedded data d3 and the generated check code d2 and returns the operation-resultant data (restored data) d4 to the original location in the block 81b (S205). When the addressing is correct, the restored data d4 are the original normal user data (partly-extracted data d1).

In order to confirm that the restored data d4 are the normal data, the controller 10 compares and collates the restored data d4 with the partly-extracted data d1 (second check data) which have been fetched from the control area 17 in the memory 12 (S206). When the values match in the comparison, the addressing is confirmed to be correct. When the values do not match, the addressing is confirmed to be incorrect. Accordingly, a corresponding process such as notification of the addressing error to the CPU 11 is performed (S207).

The controller 10 judges whether the above described processes (check processes) for all blocks 81b in the object read data have been completed or not while repeating the process for each of the blocks 81b (S208). After the processes for all blocks 81b have been completed, the controller 10 transfers the processed read data to the host (S209). The channel controlling unit 13 transmits the read data from the cache memory 15 to the host.

<Data Reliability>

The data reliability in the disk array system of the first embodiment will be described. As shown in above mentioned FIG. 3 and FIG. 5, the accesses to the control area 17 by the controller 10 are memory accesses which use a path different from that in the access to the HDDs 30. The access paths from the processing units of the controller 10, particularly, the CPU 11, the data controller 14, the disk controlling unit 16, etc. to the above described first and second check data are the paths provided separately from each other. When the access is not correctly established in a path to the respective data due to the failure in any of the members such as the data controller 14, the disk controlling unit 16, and the HDDs 30, the collation in the above described check process results in mismatch thereby the abnormality is detected.

Even if failure occurs in the control area 17, i.e. the partly-extracted data d1 cannot be referenced to, since the check code d2 is the data which are generated by calculation in each case, the user data (partly-extracted data d1) can be restored by the use of the generated check code d2. That is, the partly-extracted data d1 (data A) which are the user data can be restored by performing an XOR operation between the CC-embedded data d3 (data C) which have been read from the HDD 30 and the generated check code d2 (data B) according to the above described formula (2). However, when the control area data 72 cannot be referenced to due to the error, the check of the addressing abnormality cannot be performed. Meanwhile, when performing the RAID 5 control, in which parity is stored in the HDD 30, the data verification and recovery using the parity can be performed after the user data are restored.

In addition to the method in which a redundant code is added and recorded in the user data, the verification of the addressing correctness of the data access may be partially substituted by performing a parity check according to a RAID system (e.g., RAID 5) in which data and parity are recorded. However, the addressing abnormality cannot be detected by the parity check in some cases. That is, when addressing abnormality is present in an HDD group (for example in a case of controller failure) and the operation values of the data and parity match in a parity check, the abnormality cannot be detected. As described above, since the parity check alone is not perfect, a method in which a redundant code is added and recorded to user data is effective.

By employing this check method, correctness of read/write access to the HDD 30 can be confirmed, and even if SATA-HDD 30 in which sector length is fixed is employed, the data reliability can be ensured. In addition, when a RAID control is performed, the addressing abnormality in an HDD group can be detected. Also, since it is independent from other data, the data restoration can be performed, and even when the addressing error is detected by the check, the access can be established to the normal data by the data restoration. In addition, the load imposed on the system when this method is used is arbitrary selected by the designer side, and since the load is not so much great, the data reliability can be ensured without deteriorating the I/O performance to the HDDs 30 and both advantages of high reliability and low cost can be attained.

Also, in a method of conventional art in which check code is added and recorded to the extended part of a sector, errors cannot be detected in some cases by only the set of the user data and the check code thereof. As the undetectable error, for example, there is an error in which the HDD object area is in a write-impossible state from the controller (a state in which new write data cannot be written to the object area) due to a certain factor, and already-written old data are read from the area in the read process. When the old data read in the read process in the write-impossible state are identical to the new write data, the check code of the old data is correct. Therefore, the error cannot be detected by the above described single set. On the other hand, in the check method of this embodiment, if the value of the user data (partly-extracted data d1) extracted as the above described check data is different, the error in the above described write-impossible state and the error in which old data are read can be checked.

Second Embodiment

Figure 15:
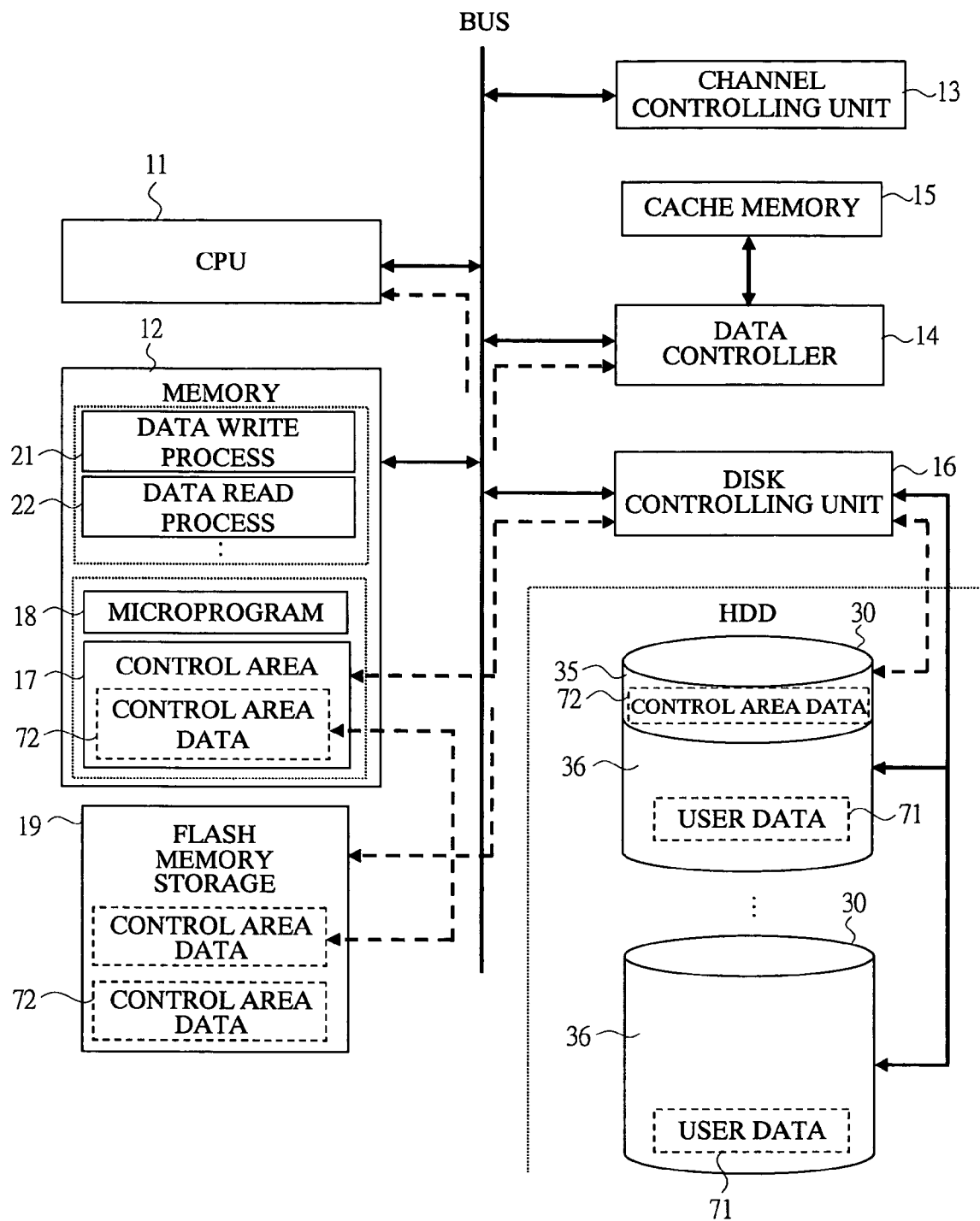
FIG. 15 is an explanatory diagram illustrating storage locations of a program and data and process flow between a controller and HDDs in a disk array system of a second embodiment of the present invention.

Next, a disk array system of a second embodiment will be described. FIG. 15 is an explanatory diagram illustrating storage locations of a program and data and process flow between the controller 10 and the HDDs 30 in the disk array system of the second embodiment. In the second embodiment, in order to ensure further enhanced data reliability, the access from the controller 10 to the control area 17 is performed to a flash memory storage 19 which is provided to have a configuration different from that of the user data access. A high-speed-accessible non-volatile flash memory storage 19 having a configuration different from the user data access (HDD access) is employed as the memory for providing the control area 17.

The flash memory storage 19 is connected to the controller 10. The flash memory storage 19 is used for storing system data and processing data. In the configuration of the diagram, particularly, the flash memory storage 19 is provided so as to be accessed at high speed from the CPU 11, the data controller 14, and the disk controlling unit 16 which are in the controller 10. The area for the control area 17 (second control area) is reserved in the flash memory storage 19 and is used in the processes relating to the addressing correctness check similarly to the first embodiment. The control area data 72 are transferred between the memory 12 and the flash memory storage 19 based on the instructions of the data controller 14. The flash memory storage 19 may be installed at any location in the disk array system 100 as long as it can be accessed at high speed from the controller 10.

In an example, processes are normally performed by mainly employing the control area 17 in the memory 12, and when little free space is left in the control area 17 in the memory 12 due to, for example, capacity limitation of the memory 12, the control area data 72 are transferred and saved into the area in the flash memory storage 19. In accordance with needs, the control area data 72 stored in the area in the flash memory storage 19 are used by loading the data to the control area 17 in the memory 12. Alternatively, an area for the control area 17 is provided not in the memory 12 but in the flash memory storage 19 and used.

In another example, because of the capacity limitation, etc. of the memory 12, the control area data 72 which are to be stored in the control area 17 in the memory 12 are transferred to the storage area of the HDD 30, and then loaded or saved. For example, when little free space is left in the control area 17 in the memory 12, the control area data 72 are transferred by the disk controlling unit 16 to the area that have been configured to be used for the control area 17 in the system area 35 of the HDD 30, and saved therein. In accordance with needs, by the disk controlling unit 16, the control area data 72 which have been saved as described above are loaded from the area in the HDD 30 used for the control area 17 to the control area 17 in the memory 12 and used.

The access to the above described area in the HDD 30 used for the control area 17 is HDD access, and also in this case, the addressing correctness of the control area data 72 can be checked by adding an identification flag or a redundant code to the control area data 72 used in the system and storing them in the area of the HDD 30. Therefore, according to the data reliability ensuring mechanism different from a case of general user data access in relation to such control area data 72, the probability of misjudging wrong data as normal data in the hardware failure can be significantly reduced.

Third Embodiment

Figure 16:
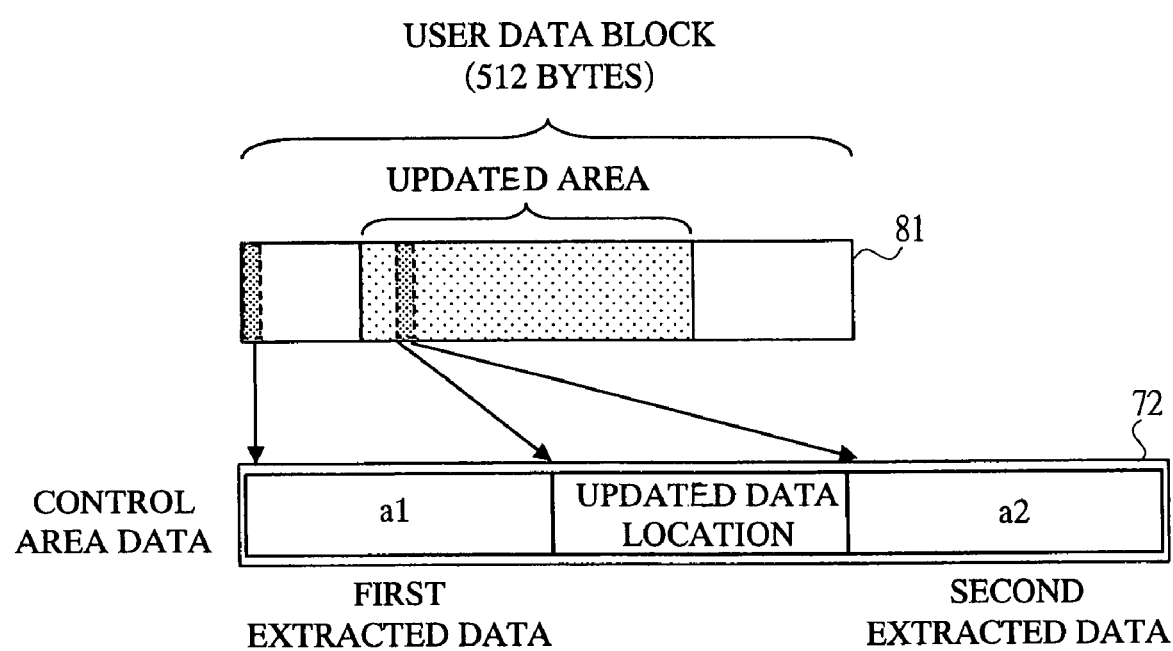
FIG. 16 is an explanatory diagram illustrating a process example according to a check method which is employed in a disk array system of a third embodiment of the present invention.

Next, a disk array system of a third embodiment will be described. FIG. 16 is an explanatory diagram illustrating a process example according to a check method of the third embodiment. In the third embodiment, data are partly extracted from a plurality of locations in a unit of processing data (block 81) of the user data, and a set of the plurality of extracted data is employed as the check data. In the third embodiment, particularly, data are partly extracted from two locations in the block 81 of the user data, and processes relating to the addressing correctness check are performed.

As it has been described in relation to the above described write-impossible state, when the partly-extracted data d1 which are the check processing object in the user data are not normally updated by the write process and the value thereof is not different from that of the check data, the error cannot be detected. In the third embodiment, in a block 81 of the user data, other than the extraction location of the partly-extracted data d1, another data part at which the data have been updated is extracted and employed as the check data so as to perform the check processes.

In the check code embedding process in the write process, according to the check code embedding process of the first embodiment, the controller 10 stores the data d1 (first extracted data a1) which have been partly extracted from the extraction location (for example, 8 bytes from the head) in the block 81 of the user data, in the control area 17 as the above described second check data. In addition, when an updated area in which values are changed by data update is present in an area other than that of the first extracted data a1 in the same block 81, the controller 10 stores, as the second check data, the updated data location and the data which have been extracted from the updated area (second extracted data a2), in the control area 17 together with the first extracted data a1. The CC-embedded data created in the same manner as the first embodiment are returned, as the first check data, to at least either one of the extraction locations (location corresponding to the a1 or a2) in the block 81. For example, the CC-embedded data created by an operation with the check code are returned to the location corresponding to the first extracted data a1, and no operation is performed on the data that are in the location corresponding to the second extracted data a2.

In a check process in the read process, the controller 10 performs the check process by the use of the check data corresponding to the above described two extraction locations of the read block 81b. For example, the check process is performed by comparing and collating the data created by performing an operation between the data in the block 81 at the location corresponding to the first extracted data a1 and the check code which is identical to that in the above described embedding with the first extracted data a1 which are in the above described check data; and then comparing and collating the data at the location of the second extracted data a2 which has been specified by the above described data of updated data location with the second extracted data a2 which are in the above described check data. Even if the value of the first extracted data a1 has not been changed by the write process, the above described write-impossible state and the error in which old data are read can also be checked by the use of the second extracted data a2 which have been stored as a set with the first extracted data a1 and corresponds to the above described updated area. An example of the case where the data value in the block 81 is updated includes the case where old data are read and calculated with new data for updating and writing parity. The controller 10 may create, in accordance with data update, the check data for the two locations of the block 81 or may create the check data of either one of them and the other one may be employed in the comparison for checking whether they are identical or not. In an example of the processing mode, when the control area 17 has an available area in the capacity, the process may be performed by employing a plurality of locations as the objects according to this check method. As described above, in the third embodiment, the data reliability is ensured even in the case of, for example, the above described write-impossible state.

Fourth Embodiment

Next, in a check method of a fourth embodiment of the present invention, unlike the check method of the first embodiment, the above described CC-embedded data d3 are stored not in the HDD 30 side but in the control area 17 side, and the above described partly-extracted data d1 are stored not in the control area 17 side but in the HDD 30 side.

FIG. 17 is an explanatory diagram illustrating the check method which is employed in the disk array system of the fourth embodiment. The diagram only shows the processes which are performed on one extraction part of the block 81. When the controller 10 writes the object user data to the HDD 30, the controller extracts a part thereof and performs an XOR operation between the partly-extracted data d1 and the check code (CC) d2 which has been generated by the calculations of, e.g. the address information of the access object. Then, the controller stores the operation-resultant CC-embedded data d3 in the control area 17 side, returns the partly-extracted data d1 to the extraction location in the user data, and writes them to the HDD 30. When the controller 10 reads the object user data from the HDD 30, the controller fetches the part corresponding to the partly-extracted data d1 from the data, performs an XOR operation between the fetched data and the check code (CC) d2 which has been generated by calculations of, for example, the address information of the access object, and compares and collates the operation-resultant data with the CC-embedded data d3 which have been stored in the control area 17 so as to check the addressing correctness. When it is correct, the operation-resultant data are identical to the CC-embedded data d3 in the control area 17 side.

An existing system can be applied to the check method of the fourth embodiment without making great change of the layout thereof since processing of the user data to be recorded in the HDD 30 is not performed. In addition, since data conversion for processing the user data is not required in the read/write processes performed on the HDD 30, the load on the process is small. In this method, by merely performing a check equivalent to that of the comparison with the partly-extracted data for the user data, whether the control area data 72 in the control area 17 side are accessed correctly or not can be checked. However, this case has a demerit that the check cannot be performed when the user data have a uniform pattern. Therefore, in the case where the data in the HDD 30 tend to have a uniform data pattern, for example, at the time of formatting (a process in which all data are set to be "0"), a process is performed in which the CC-embedded data d3 are stored in the HDD 30 side and "0" data are stored in all of the control area 17 side inversely (particular format process). Similarly, also in an ordinary use, when a continuous uniform data pattern given from the host is written to the HDD 30, the error detection ability may be lowered in the part of the data when compared with the case where processed user data (CC-embedded data) are stored in the HDD 30 side. Therefore, it is preferable to use also the parity check or the like.

Fifth Embodiment

Next, in a check method of a fifth embodiment of the present invention, unlike the check method of the first embodiment, in a check process in the read process, the first check data (the above described CC-embedded data d3) which have been fetched from the block 81b of the user data read from the HDD 30 are not subjected to an XOR operation with the check code d2, but subjected to an XOR operation with the secondcheck data (the above described partly-extracted data d1) which are in the control area 17, and the operation-resultant data are compared and collated with the check code d2 so as to check the addressing correctness.

FIG. 18 is an explanatory diagram illustrating the processes of the check method used in the disk array system of the fifth embodiment. The diagram shows only the processes for one extraction part of the block 81. When the controller 10 writes the object user data to the HDD 30, the controller creates the check data in the same manner as the first embodiment. That is, the CC-embedded data d3 are stored in the HDD 30 side, and the partly-extracted data d1 are stored in the control area 17 side. Also, when the controller 10 reads the object user data from the HDD 30, the controller fetches the part of the CC-embedded data d3 from the user data and performs the XOR operation between the fetched data and the partly-extracted data d1 which have been stored in the control area 17, and compares and collates the operation-resultant data with the check code (CC) d2 which have been generated by calculations of, for example, address information of the access object so as to check the addressing correctness. When it is correct, the operation-resultant data are identical to the check code d2. By returning the normal partly-extracted data d1 to the original location, the user data are restored. In this check method, even if uniform data continue (e.g., "AAAAAAAA") in the check object original data, check can be performed.

As another embodiment, this check method can be also applied to the case of the above described fourth embodiment (configuration in which the storing location of the CC-embedded data d3 is in the control area 17 side). That is, the check code embedding process is performed in accordance with the check method of the fourth embodiment; and in a check process in the read process, the first check data (the partly-extracted data d1), which have been fetched from the block 81b of the user data read from the HDD 30, are not subjected to an XOR operation with the check code d2, but subjected to an XOR operation with the second check data (the CC-embedded data d3) which are in the control area 17, and the operation-resultant data are compared and collated with the check code d2 so as to check the addressing correctness.

Sixth Embodiment

Next, a disk array system of a sixth embodiment will be described. In a check method of the sixth embodiment, processes relating to the addressing correctness check are performed for a part of the disks in the plurality of HDDs 30, particularly, only for the parity disk in a RAID group. In a configuration such as that of RAID-4 or 5(6) having a parity disk, the check code embedding process is performed only for the parity disk; and a check process corresponding to the embedding process and parity check of data are used in combination. The hardware configuration and the general outline of the process for each block are same as those in the first embodiment.

FIG. 19 is an explanatory diagram illustrating the processes of the check method which are used in combination with parity check in the sixth embodiment. The diagram only shows the processes that are performed for the extraction part of the block 81. As is shown in the example in FIG. 6, the controller 10 subjects the user data to striping in accordance with the configuration of the RAID 5. For example, the data partly extracted from the block 81 corresponding to the striping data in the disk write are data {A, B, and C}. The block 81 serving as parity of the data is parity data P. The controller 10 performs the check code embedding process in the same manner as the first embodiment, only for the parity data P of the user data which are stored in the parity disk. The controller 10 stores, as the second check data, the parity data P which have been partly extracted from the parity in the control area 17; performs an XOR operation between the parity data P and the check code d2; and stores, as the first check data, the resultant CC-embedded data d3 in the parity disk (HDD 30). Meanwhile, the data {A, B, and C} are stored in the data disk (HDD 30).

In the disk read, the controller 10 performs the check process only for the parity disk. The controller 10 performs an XOR operation between the CC-embedded data d3 which have been fetched from the data read from the parity disk and the generated check code d2 and compares the operation-resultant data (if normal, parity data P) with the parity data P which have been stored in the control area 17. When the addressing is correct, the values match and the parity read from the parity disk is confirmed to be normal. By the use of the parity, the controller 10 performs parity check of the data corresponding to the data {A, B, and C} which have been read from each data disk so as to obtain the original user data. When an error is present in the data read from the data disk, the data can be restored by an XOR operation using parity.

In a configuration in which the CC-embedded data d3 are stored in the control area 17 side, when the check is performed for parity, even if an error occurs in parity read due to failure or the like of the parity disk, since the parity regenerated from each data in the data disk are used for the collation with the data stored in the control area 17, the addressing correctness can be checked in the same manner as the case of the normal parity.

FIGS. 20A and 20B are flow diagrams of the processes performed by the controller 10 in the check method in the disk array system of the sixth embodiment. The diagrams particularly show the cases where the data controller 14 in the controller 10 is a main process executor. The left side (FIG. 20A) shows processes (including the above described first process) in the disk write, and the right side (FIG. 20B) shows processes (including the above described second process) in the disk read. The CPU 11 or the disk controlling unit 16 can be the main process executor for executing the processes described below in the same manner.

In FIG. 20A, in the disk write, the controller 10 accepts write data from the host (S301) The controller 10 confirms whether the type of the write data to be stored in the write object HDD 30 (disk area) is data (non-parity) or parity (S302). When the data type is data, the check code embedding process is not performed for the data. When the data type is parity, the check code embedding process is performed for the parity data.

The controller 10 performs the processes for each block 81 of the parity data in the same manner as the first embodiment (S303 to S306). The controller 10 judges whether the processes (check code embedding processes) of all blocks 81 in the object write data (parity data) have been completed or not while repeating the process for each of the blocks 81 (S306). After the processes of all blocks 81 of the parity data have been completed, the controller 10 performs a write process in which the processed write data (data and parity) are transferred and written to the HDDs 30 (HDDs corresponding to a RAID group) which are the data write object (S307).

In FIG. 20B, in the disk read, the controller 10 accepts a read request from the host (S401). The controller 10 performs a read process of the object data for the HDDs (HDDs 30 corresponding to a RAID group) which are the data read object (S402). The object data (data and parity) are read from the HDDs 30 by the read process.

The controller 10 performs processes for each block 81b of the data in the parity disk among the read data in the same manner as the first embodiment (S403 to S407 and S409).

After the controller 10 compares the data d4, which have been restored by the XOR operation, with the corresponding data which are in the control area 17 so as to check the addressing correctness and confirms that the data are normal data (S406-YES), the controller performs a parity check between the restored data d4, i.e. parity data and the data (non-parity) read from the data disk. The controller 10 compares the restored data d4, i.e. parity data with the parity regenerated from the data (S408). When the values match in the comparison, the data addressing is confirmed to be correct. When the values do not match in the comparison, the addressing of the data is confirmed to be incorrect. Therefore, a corresponding process such as notification of error to the CPU 11 is performed (S407).

The controller 10 judges whether the processes (check processes) of all blocks 81b in the object read data have been completed or not while repeating the process for each of the blocks 81b (S409). After the processes of all blocks 81b of the parity data have been completed, the controller 10 transfers the processed read data to the host (S410). The channel controlling unit 13 transmits the read data from the cache memory 15 to the host.

In this check method, the processes performed for the parity disk in relation to the addressing correctness check and the parity check process of data by using the correctness-checked parity are used in combination. Therefore, in comparison with the first embodiment in which processes are performed for all disks, the processes are performed only for the parity. Accordingly, the required storage capacity of the control area 17 and the processing load can be reduced.

For example, when 4 bytes are extracted from a block unit (512 bytes) and parity alone is employed as the processing object in a configuration of RAID 5 having "4D+1P (data disks×4+parity disk×1)", the required storage capacity of the control area 17 is reduced by 4/(4×512) (maximum capacity ratio: 99.8%, required capacity: 0.2%) when compared with the storage capacity of the case where no particular process is performed. The required capacity of the control area 17 can be further reduced by, for example, expanding the number of data disks and a unit of processing data. For example, in a configuration having "8D+1P, stripe size unit: 64 KB", the required capacity is calculated to be 0.000763%. The calculation formula of the required capacity of the control rea 17 is, in a configuration having one parity disk, "control area capacity=(x÷(m×n))×maximum capacity per one disk", wherein x is the number of bytes extracted from a unit of processing data (block 81), m is the number of bytes of the unit of processing data, and n is the number of data disks.

Seventh Embodiment

Next, a disk array system of a seventh embodiment will be described. In a check method of the seventh embodiment, the addressing correctness check is also performed in the same manner as the sixth embodiment in a configuration such as that of RAID-1 or 0+1 in which mirroring is performed as RAID control and mirror disks are provided. The check code embedding process is performed only for one of the disks in a mirror/main RAID group, and a check method corresponding to the embedding process is performed in combination with data restoration by the mirror data. The hardware configuration and the general outline of the process for each block are the same as those in the first embodiment.

FIG. 21 is an explanatory diagram illustrating the processes of the check method which is employed in combination with mirroring in the seventh embodiment. The diagram shows only the processes performed for the part extracted from the block 81. The controller 10 performs the mirroring (duplication) of the user data in accordance with the configuration, for example,. RAID 1. For example, the partly-extracted data of a block 81 corresponding to the data (main/mirror) stored in a plurality of disks that form a mirror in the disk write is referred to as data A. The controller 10 performs a check code embedding process in the same manner as the process in the first embodiment only for the data A stored in) one side of the disks (for example, main HDD 30) in the disks forming the mirror. The controller 10 stores the data A in the control area 17 as the second check data, performs an XOR operation between the data A and the check code d2, and stores the resultant CC-embedded data d3 in the above described side of the disk (main) as the first check data. The data A of the other side are stored in the disk of the other side (mirror HDD 30).

In the disk read, in response to the processes of disk write, the controller 10 performs the check process only for one side of the disks which form the mirror. The controller 10 performs an XOR operation between the CC-embedded data d3 which have been fetched from the data read from the disk (main) and the generated check code d2, and compares the operation-resultant data (if normal, data A) with the data A which have been saved in the control area 17. When the addressing is correct, the values match, and the data read from the disk (main) are confirmed to be normal. The controller 10 performs the comparison by the use of the normal data to check the data read from the other disk (mirror). As a result, the correctness of the data in the other disk (mirror) is also checked. When an error is present in the data read from the other disk (mirror), restoration is performed by the use of the normal data.

In this check method, the capacity of the control area 17 and the processing load can be reduced when compared with the case where the check is performed by embedding the check code in both mirror/main disks. The capacity of the control area 17 can be reduced in accordance with the data quantity in the disk which is not the object of the check code embedding process in the plurality of disks which form the mirror.

This check method can be configured such that the above described LBA alone is employed as the check code, and the control area 17 is shared by a plurality of disks forming the mirror.

Eighth Embodiment

Next, as a check method employed in a disk array system of an eighth embodiment of the present invention, processes relating to check are performed in the same manner as the first embodiment and a plurality of the blocks 81 in the user data are collectively controlled, thereby enabling the reduction of the required storage capacity of the control area 17.

Figure 22:
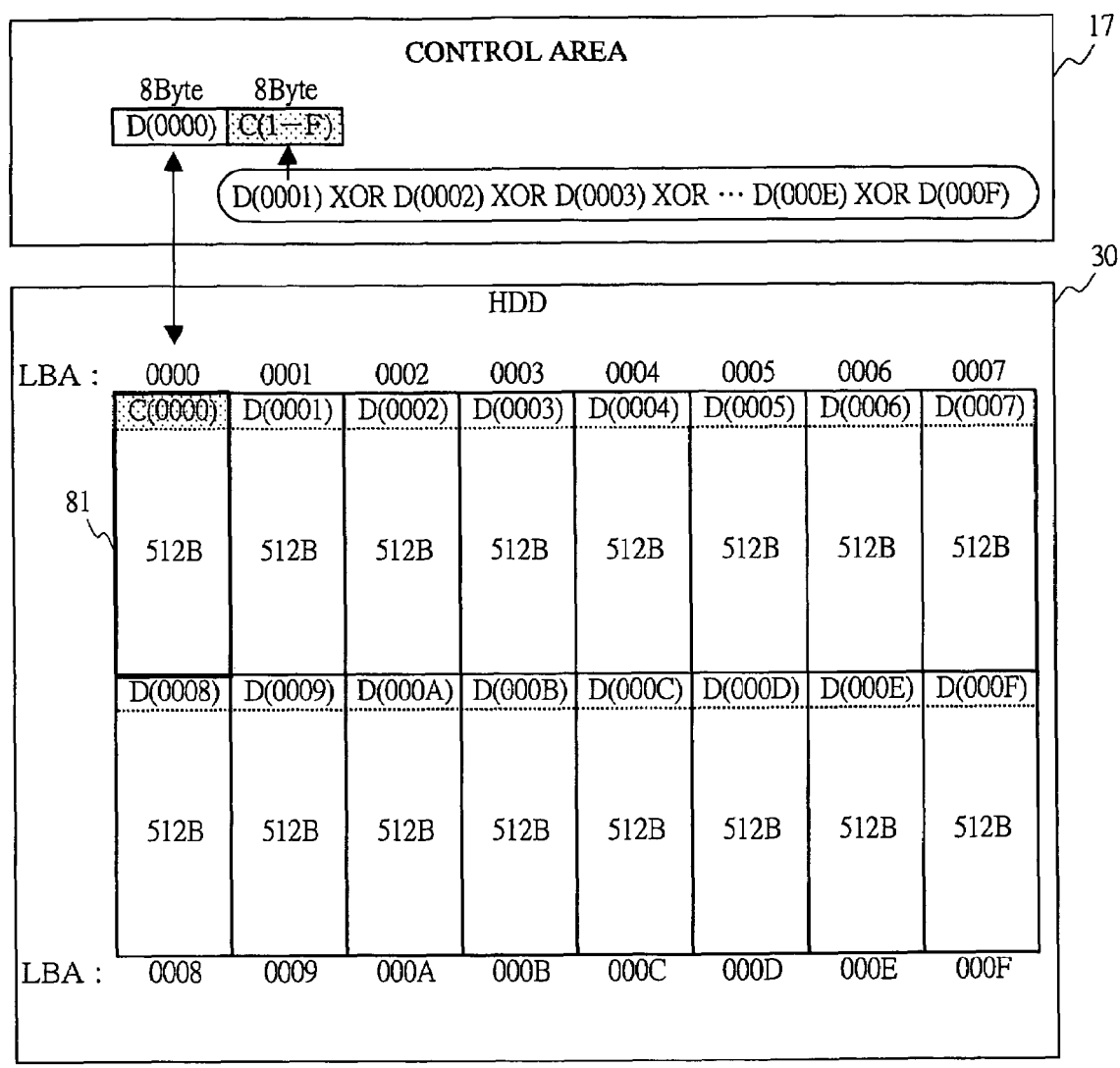
FIG. 22 is an explanatory diagram in the case where a plurality of blocks of user data are collectively controlled as one unit and the processes relating to the check are performed in a disk array system of an eighth embodiment of the present invention.

FIG. 22 is an explanatory diagram of the eighth embodiment wherein a plurality of blocks 81 of the user data are collectively controlled as one unit, and the processes relating to the above described check are performed. The diagram shows an example in which 16 blocks (8 KB) of the plurality of blocks 81 are employed as one control unit. The LBAs in the HDD 30 are, for example, 0000 to 000F, and data of one block (512 bytes) are stored in the area of each LBA. The diagram shows an example in which data D(000) to D(000F) are stored respectively in 8-byte heads of extraction locations in each of the blocks 81.

In the check code embedding process and the check process, 16 blocks of data are employed as one control unit. For example, among the 16 blocks of the object data, the controller 10 employs the first one block as the object block of the data extraction for the above described check code embedding. Then, the controller extracts a data part (for example, 8 bytes from the head) from the first block of the user data and stores the partly-extracted data in the control area 17 as the second check data. For example, extracted data D (0000) (8 bytes) which have been extracted from the block having LBA of "0000" are stored in the control area 17. Then, the CC-embedded data C(0000) which have been created by an XOR operation between the partly-extracted data and the check code are returned to the extraction location of the partly-extracted data in the first one block to store them in the HDD 30 side. Then, data C(1-F) which are the result of XOR operations of data part (D(0001) to D(000F)) of other 15 blocks corresponding to the extraction location of the partly-extracted data of the one block, are stored in the control area 17 as a set with the extracted data D(0000) The data C(1-F) are obtained by XOR operations of D(0001) to D(000F). Meanwhile, in the read process, a check process corresponding to the 16 blocks is performed by the use of the CC-embedded data C(0000) in the HDD 30 side, the check data D(0000) in the control area 17 side, and C(1-F). By expanding the data size of the control unit as described above, the capacity of the control area 17 can be further reduced.

Meanwhile, as another embodiment, in the case where parity check is performed by the sampling in a configuration of performing the RAID control, that is, in the case where a check employing parity is not performed in a normal read and parity check is performed by the use of sampling data (data and parity) taken from the HDD 30 during the sampling executed by the controller 10, the check process can be executed at the same timing as the execution thereof.

FIG. 23 is a table summarizing characteristics of the combinations of the above described check methods. The symbol correspond to meanings as follows: (O: Applicable), (Δ: Applicable but not Recommended), and (–: Not Applicable). The capacity of the control area 17 is variable according to not only the methods shown in the table but also the size of the extracted data and the unit of the control object data (e.g., block unit, cluster (a plurality of blocks) unit of OS, etc., and data stripe unit of a RAID group). As shown in the table, regarding the object disk (HDD 30) to which the check code embedding process is performed among the plurality of HDDs 30, there provided the case where all the disks are employed as the object (first embodiment), the case where only one side of the mirror/main of the mirror disks is employed as the object (seventh embodiment), and the case where only the parity disk is employed as the object (sixth embodiment). Also, as the storing destination of the check-code-embedded data (CC-embedded data d3), there provided the HDD 30 side (first embodiment) and the control area 17 side (fourth embodiment). In addition to these, the examples formed by the combinations of the followings are also available, that is, a process employing the flash memory storage 19 and the system area 35 (second embodiment), a process in which data are extracted from plural locations of the block 81 so as to generate the check data (third embodiment), and a process in which the check data which have been fetched from the data read form the HDD 30 are subjected to an XOR operation with the control area data 72 and then compared with the check code d2 (fifth embodiment).

Applicable RAID levels are {0, 1, 0+1, 4, 5(6)}. The cases employing all disks as the object can be applied to every RAID level of these. The cases employing the mirror/main as the object can be applied to RAID-1 and 0+1. The cases employing the parity disk as the object can be applied to RAID-4 and 5(6). In the case where the CC-embedded data d3 are stored in the control area 17 side (fourth embodiment), reliability can be improved by the process using both the comparison by means of parity check and mirror data. Although RAID 3 is not shown in the table, it is equivalent to the case of RAID 4.

As described above, differences reside in required capacities of the control area 17. Particularly, when the parity disk is employed as the object, the capacity of the control area 17 can be reduced. Also, the above described comparison by means of both the parity and mirror can be performed. Meanwhile, differences reside in the user data conversion processes for the HDD 30 and the load thereof. When the CC-embedded data d3 are stored in the control area 17 side, the user data conversion process is not required. Particularly, when the parity disk is employed as the object, the load is reduced. Also, reliability is different when the user data to be stored in the HDD 30 have a continuous uniform data pattern. When the CC-embedded data d3 are stored in the HDD 30 side, the check can be performed even if a continuous uniform data pattern is provided. When the CC-embedded data d3 are stored in the control area 17 side, the above described particular format process or the like is performed so as to be able to deal with the continuous uniform data.

Ninth Embodiment

Figure 24:
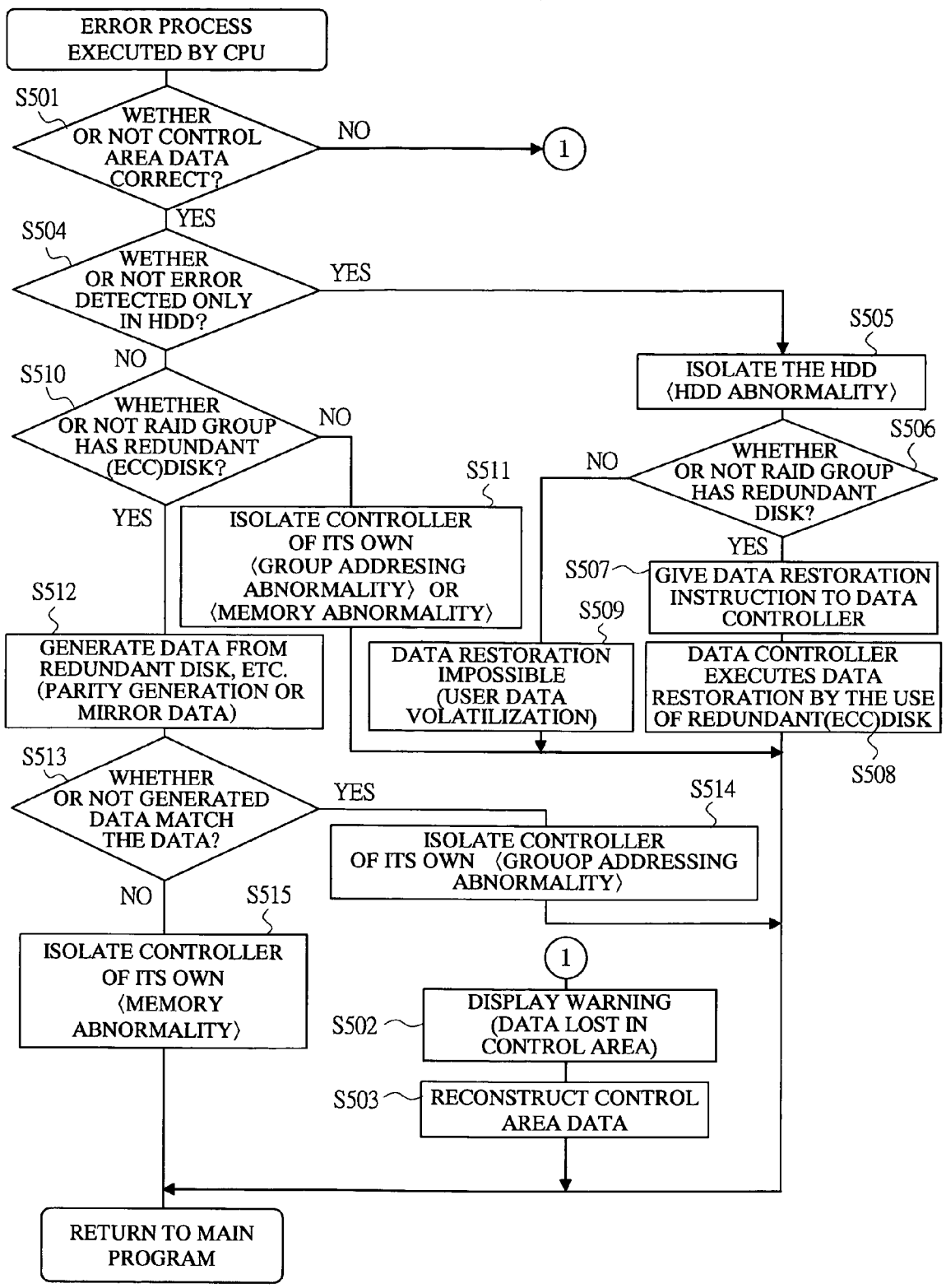
FIG. 24 is a flow diagram of an error process which is executed by a CPU of the controller as an error process, which corresponds to the case where a check code embedding process is performed for all disks in the HDD group in a disk array system of a ninth embodiment of the present invention.
Figure 25:
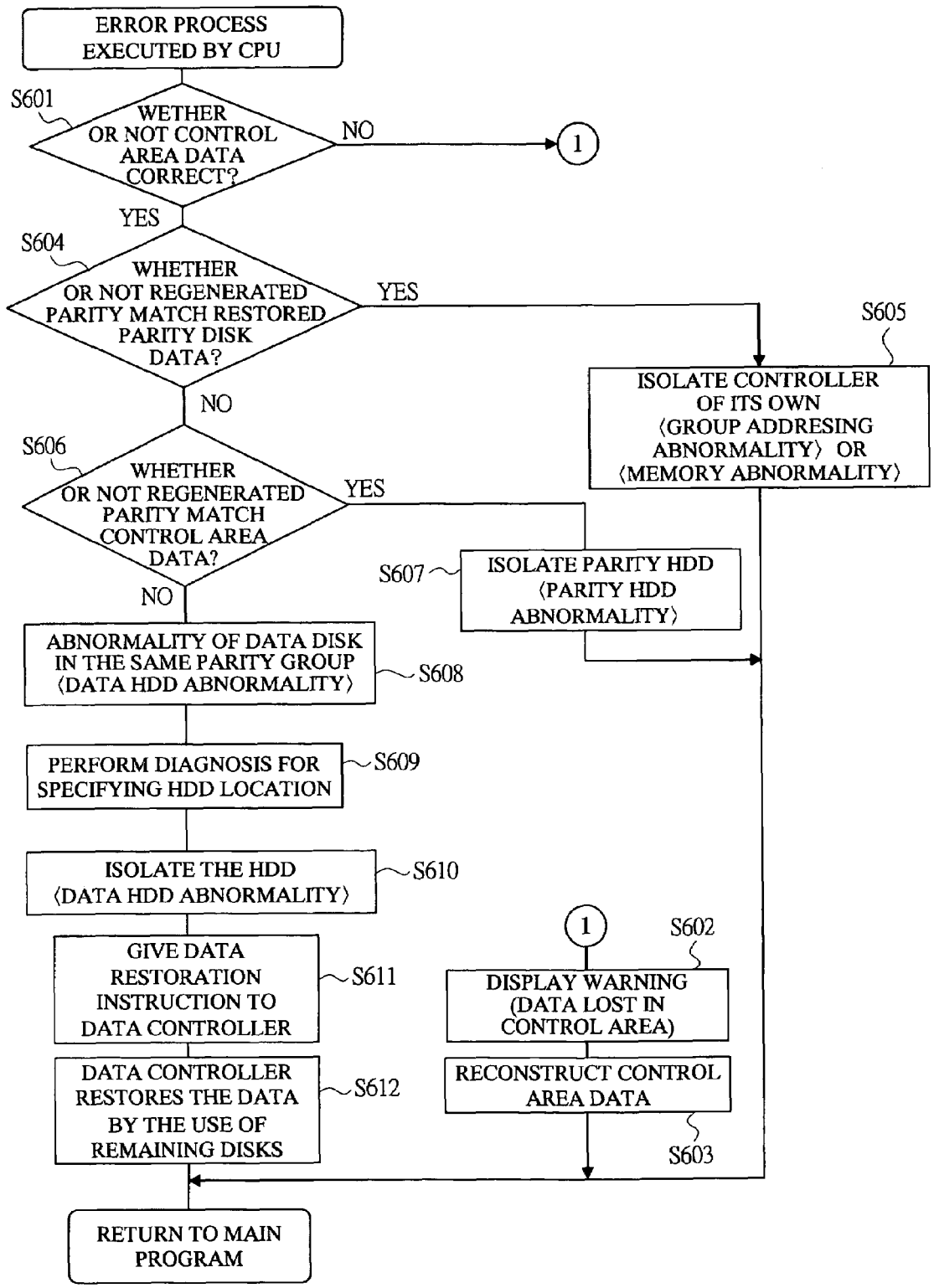
FIG. 25 is a flow diagram of an error process which is executed by the CPU of the controller as an error process, which corresponds to the case where a check code embedding process is performed for only the parity disk in the HDD group in the disk array system of the ninth embodiment of the present invention.

Next, a procedure which is performed when addressing abnormality (error) is detected in the check method of, e.g., the first embodiment will be described. In a disk array system of a ninth embodiment, in addition to the check method processes of the above described embodiments, an error-handling process (error process) is performed when an error is detected in the check process. FIG. 24 and FIG. 25 are flow diagrams of the processes executed by the CPU 11 of the controller 10 as the error process of the ninth embodiment. The error processes shown in the diagrams are performed when the result of a retry of data access is NG.

FIG. 24 shows an error process (P1) corresponding to the case where the check code embedding process is performed for all disks in the HDD group (first embodiment), and FIG. 25 shows an error process (P2) corresponding to the case where the check code embedding process is performed for only the parity disk (sixth embodiment).

P1: First, when all disks are employed as the object, the procedure is as follows. This case includes a process (P1-1) performed when abnormality is detected in only one HDD 30, and a process (P1-2) performed when abnormality is detected in all HDDs 30 described below.

P1-1: When addressing abnormality is detected in only one HDD 30, the abnormality is judged to be present only in the one HDD 30. In this case, if a data read process is retried to the HDD 30 and again resulted in NG, the disk array system isolates the HDD 30 and performs data restoration based on, except the case of RAID 0, the redundant disk.

P1-2: When abnormality is detected in all HDDs 30, the abnormality is judged to be present not in the HDD 30 side but in the control system. In this case, if a data read process is retried to the HDD 30 and again resulted in NG, the disk array system isolates the controller 10 which is in charge of control of the HDDs 30. When the controller 10 is redundant in the configuration, the charge for controlling the HDDs 30 is transferred to another controller 10.

When parity is employed in the case where abnormality is detected in all HDDs 30, the disk array system generates parity from the data of the data HDD (HDD 30 storing data (non-parity)). Then, following three processes are provided.

P1-2-1: When the number of data HDDs are even, the process is as follows. Since the check code is not included in the parity generated from the data HDD, the result of an XOR operation with the parity P (control area 17 side) becomes the check code. Therefore, when the location in the control area 17 indicated by the check code is identical to the generated parity, the error is judged to be failure in the HDD group access system.

P1-2-2: When the number of the data HDD is odd, the process is as follows. When the parity generated from the data HDD is identical to the parity P (control area data 72), the error is judged to be failure in the HDD group access system.

P1-2-3: In a case other than the above described cases, the error is judged to be partial failure or the like in the memory. Partial memory failure can be diagnosed in the system. When the failure is more serious than the above described failure, generally, operation is impossible.

P2: Next, when only the parity disk is employed as the object, the procedure is as follows.

P2-1: When the parity generated from the data HDD is identical to the parity P stored in the control area 17 although the result of the check process is abnormal, the error is judged that the abnormality is present in the parity HDD. In this case, if a data read process is retried and again resulted in NG, the disk array system isolates the parity HDD from own system.

P2-2: When the result of the check process is abnormal and the parity generated from the data HDD is not identical to the parity P stored in the control area 17, the error is judged that abnormality is present in the control system. In this case, if the data read process is retried and again resulted in NG, the disk array system isolates the controller 10 which is in charge of control of the HDD 30 from its own system.

P2-3: When the parity generated from the data HDD is not identical to the parity P stored in the control area 17 although the result of the check process is normal, the error is judged that the abnormality is in the data HDD. In this case, if the data read process is retried and again resulted in NG, the location of the abnormal data HDD is not specified, therefore a self-diagnosis process employing, for example, a diagnosis area in which a specific data pattern has been written is required in the disk array system. As a result of the diagnosis, abnormal data HDD is specified.

In FIG. 24, the CPU 11 of the controller 10 performs the following processes based on the error detection relating to the data in a certain HDD 30. The CPU 11 diagnoses whether the control area data 72 (check data) in the memory 12 are correct or not (S501). When an error is present in the control area 17 (S501-NO), the CPU 11 performs an output process such as displaying a warning, e.g., "volatilization (lost) in control area data" to, for example, the control device and the control program (S502), performs reconstruction of the control area data 72 (S503), and returns to the main program.

When the control area data 72 are correct (S501-YES), subsequently, the CPU 11 judges whether the error is detected only in the HDD 30 or not (S504). When the error is detected only in the HDD 30, the CPU judges it as "HDD abnormality" and performs a process for isolating the HDD 30 (S505). Then, when a redundant disk (e.g., parity disk) is provided in the RAID group (S506-YES), the CPU 11 instructs the data controller 14 to perform data restoration by the use of the redundant disk (S507). The data controller 14 which have received the instruction reads data from the redundant disk and executes data restoration regarding the isolated HDD 30 (S508). After the data restoration, the CPU returns to the main program. When no redundant disk is present in the RAID group (S506-NO), the data restoration cannot be performed due to the user data volatilization (lost) (S509), and the CPU returns to the main program.

When the error is also detected in an HDD 30 other than the HDD 30 (S504-NO) and when no redundant disk is provided in the RAID group (S510-NO), the CPU 11 judges the error as "group addressing abnormality" or "memory abnormality" and performs a process for isolating the substrate of the controller 10 of its own (S511), and returns to the main program.

When a redundant disk is provided in the RAID group (S510-YES), the CPU 11 generates the data from the redundant disk, etc. (S512). That is, the data are generated by parity generation or mirror data. Then, the CPU 11 judges whether the generated data are identical to the aforementioned data or not (S513). When the generated data are identical to the data, the CPU judges the error as "group addressing abnormality", performs a process of isolating the substrate of the controller 10 of its own (S514), and returns to the main program. When the generated data are not identical to the data, the CPU judges the error as "memory abnormality", performs a process of isolating the substrate of the controller 10 of its own (S515), and returns to the main program.

In FIG. 25, the CPU 11 of the controller 10 performs the following processes based on the error detection relating to the parity disk. The CPU 11 diagnoses whether the control area data 72 in the memory 12 are correct or not (S601). When the error is present in the control area 17 (S601-NO), the CPU 11 performs an output process (S602) such as displaying of a warning in the same manner as the above described process (P1), performs reconstruction of the control area data 72 (S603), and returns to the main program.

When the control area data 72 are correct (S601-YES), subsequently, the CPU 11 compares and judges if the parity regenerated from the data of the data disk are identical to the restored parity data of the parity disk (S604). When it is identical to the data of the parity disk, the CPU 11 judges the error as "group addressing abnormality" or "memory abnormality",performs a process of isolating the substrate of the controller 10 of its own (S605), and returns to the main program.

When the regenerated parity is not identical to the data of the parity disk (S605-NO), the CPU 11 compares and judges whether the above described parity regenerated from the data are identical to the corresponding control area data 72 (parity) or not (S606). When it is identical to the control area data 72, the CPU judges the error as "parity HDD abnormality", and performs a process of isolating the parity HDD (S607) from own system.

When it is not identical to the control area data 72 (S606-NO), the CPU 11 judges the error as "data HDD abnormality", i.e. judges that abnormality is present in a data disk which is in the same RAID group (S608). Then, the CPU 11 specifies the location of the abnormal data HDD and executes a diagnosis in order to distinguish the abnormal data HDD from normal data HDDs (S609). The CPU 11 performs a process of isolating the data HDD which has been specified as "data HDD abnormality" based on the diagnosis (S610). Then, the CPU 11 instructs the data controller 14 to perform data restoration of the isolated data HDD (S611). The data controller 14 executes data restoration according to the instruction by the use of the data in the rest of the disks in the same RAID group (S612). After the data restoration, the CPU returns to the main program.

As described above, appropriate processes (error processes) are performed in the disk array system based on the result of the check process.

Tenth Embodiment

Next, as another embodiment of the present invention, in a disk array system of a tenth embodiment, a process (data conversion process) in which an orderly code (mask pattern) obtained by a calculation is embedded in the user data which are to be stored in the HDD 30 is performed in addition to the processes of the above described embodiments. Accordingly, data patterns that tend to cause adverse effects in the signal quality are avoided, thereby improving the data reliability. The hardware configuration, etc. are the same as the above described embodiments.

In a storage (e.g., disk array system and HDD) in which serial transfer is performed, a PLL circuit for synchronizing signals is generally employed. However, since the frequency is varied depending on the data pattern, some data patterns tend to cause adverse effects in the signal quality due to repeated transfer of uniform data pattern and combinations of data. In order to avoid generation of such data pattern, an XOR operation is performed between the orderly pattern obtained by a calculation and the user data, and the result is written to the HDD 30 in this embodiment. Accordingly, the above described adverse effects can be avoided.

Figure 26:
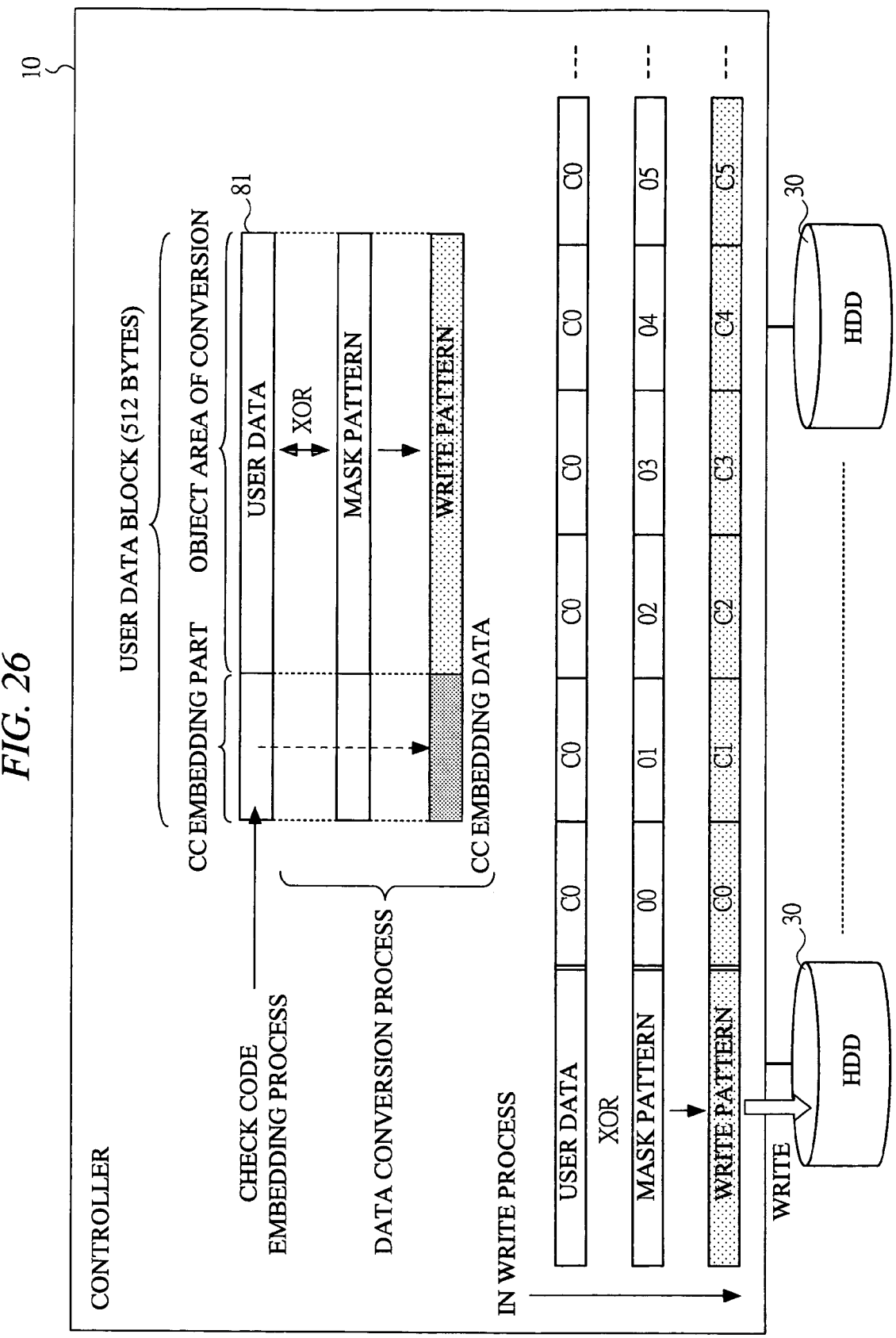
FIG. 26 is an explanatory diagram of an example of a data conversion process which is employed in a disk array system of a tenth embodiment of the present invention.

FIG. 26 is an explanatory diagram of an example of a data conversion process of the tenth embodiment. In the write process, the controller 10 performs a process in which the check data are created by embedding the check code in the extraction location (CC-embedding part) that is the object for embedding the check code in each block 81 of the user data, and performs an operation for embedding the mask pattern generated by a calculation in the area (conversion object area) other than the above described CC-embedding part. The operation is an XOR operation between the conversion object area and the mask pattern. The data pattern generated by the conversion is employed as the write pattern for the HDD 30. Meanwhile, in the read process, after reading the write pattern from the HDD 30, the controller 10 performs an operation for removing the mask pattern and performs a check process by the use of the above described check data.

As shown in FIG. 26, the original user data, which have not yet subjected to write to the HDD 30 and the data conversion, have a data row of, for example, {C0, C0, C0, ... } in which uniform data "C0" (hexadecimal number) are continued. The mask pattern is, for example, a pattern consisting of continuous incremental data such as a data row of {00, 01, 02 ... , FF} (hexadecimal number).

In the write process, the controller 10 generates a mask pattern such as that of the example by a predetermined calculation. A pattern having a random data row may be employed as the mask pattern as long as the pattern is determined uniquely by a calculation. The controller 10 performs, as data conversion, an XOR operation between the user data (above described conversion object area) and the mask pattern. The write pattern generated by the conversion has a data row of, for example, {C0 0C1, C2 ... }. Then, the controller 10 writes the write pattern to the object HDD 30. By the data conversion, the user data are changed to the data having varied signal level, therefore, the above described adverse effects can be avoided. In the read process, the controller 10 restores the original user data by performing data conversion by another XOR operation between the data read from the HDD 30 and the mask pattern.

FIGS. 27A and 27B are process flow diagrams of the case where the data conversion is performed by the controller 10. The diagrams particularly show the case where the data controller 14 is the main process executor and the process is performed for all disks of the plurality of HDDs 30. The left side, FIG. 27A shows processes in the disk write and the right side, FIG. 27B shows processes in the disk read. Meanwhile, the configuration in which the CPU 11 executes the following processes in the same manner by a program is also available.

In FIG. 27A, in the disk write, the controller 10 accepts write data from the host (S701). The write data are stored in the cache memory 15. The controller 10 extracts a part of the write data from each block 81, and stores the partly-extracted data d1 as the second check data in the control area 17 in the memory 12 (S702). The controller 10 generates the check code d2 of the write data based on the address information (S703).

In relation to the block 81 of the write data, the data controller 14 generates mask data for the data part (above described conversion object area) except for the CC-embedding part by a calculation (S704). Then, the data controller 14 performs the check code embedding process to the write data and data conversion by the use of the mask data. That is, in relation to the write data, an XOR operation is performed between the partly-extracted data d1 and the generated check code d2 to return the operation-resultant CC-embedded data d3; and an XOR operation is performed between the conversion object area and the generated mask data, and the operation result is returned to the original location in the write data (S705). As a result, the check code d2 is embedded in the user data and the data pattern is converted. The converted block 81c is stored in the HDD 30.

The controller 10 judges whether the above described processes of all blocks 81 in the object write data have been completed or not while repeating the process for each of the blocks 81 (S706). After completing the processes of all blocks 81, the controller 10 performs a data write process of the processed write data to the HDDs 30 serving as the write object (S707).

In FIG. 27B, in the disk read, the controller 10 accepts a read request from the host (S801). The controller 10 performs a data read process for each of the HDDs 30 serving as the data read object (S802). According to the read process, the object data are read from each of the HDDs 30, and the read data are stored in the work memory. The controller 10 fetches the CC-embedded data d3 from each block 81c of the read data (S803). The controller 10 generates the check code d2 of the read data based on the address information (S804).

In relation to the block 81 of the read data, the data controller 14 generates, by a calculation, the mask data for the data part (above described conversion object area) other than the CC-embedded part (S805). Then, the data controller 14 performs data conversion for removing the mask pattern for the read data and restoration of the user data. That is, in relation to the read data, the data controller 14 performs an XOR operation between the CC-embedded data d3 and the check code d2, performs an XOR operation between the conversion object area and the mask data, and returns the operation result to the original location in the read data (S806).

The controller 10 compares and collates the restoration data (if normal, the CC-embedded data d3) of the CC-embedded part and the partly-extracted data d1 in the control area 17 in the memory 12 (S807). When the values match in the comparison, the addressing is confirmed to be correct. When the values do not match in the comparison, the addressing is confirmed to be abnormal, accordingly, a corresponding process such as notification of error to the CPU 11 is performed (S808). The controller 10 judges whether the above described processes of all blocks 81c in the read data have been completed or not, and repeats the process for each of the blocks 81c (S809). After completing processes for all blocks 81c, the controller 10 transfers the read data to the host (S810).

FIG. 28 shows a comparison of bit variations in the case where the data conversion process of this embodiment is not performed and the case where the conversion process of this embodiment is performed when the data patterns having large electric power supply variation factors (32-bit bus, all bit ON or OFF) are provided. The left side shows the original user data, and the right side shows the data (write pattern) which have been converted by the mask patterns shown in the diagram. For example, the bus data of the original data have patterns such as "00000000" and "FFFFFFFF" that cause a switching noise or ground bounce by switching large electric current. The mask patterns are, for example incremental data such as "00, 01, 02, 03 ... ". The converted data have patterns in which the values of the bus data have been changed, and the switching noise and ground bounce by switching large electric current are reduced. The average value of the switching noise and ground bounce is the average of the absolute values of each switching noise and ground bounce. In a simple comparison, as shown by the average values shown below the table, the variation rate of the signal line is reduced to 77% when compared with the case where conversion is not performed, and the electric power variation rate is also greatly reduced to 28%.

Major quality deteriorating factors relating to the data pattern include frequency resonance, a switching noise or ground bounce, and cross talk. Specific example of the data pattern which causes frequency resonance includes a repetition of a uniform data pattern. For example, repetition of above described "FF" or "00" causes voltage variation. According to this data conversion process, regarding the frequency resonance, since the codes are converted to that having different frequencies, resonance or phase lock can be avoided. In addition, regarding the switching noise or ground bounce, simultaneous repeated switching of all signal lines can be avoided.

According to this data conversion process, in the data transfer between the controller 10 and the HDDs 30, the signal tracking capability can be ensured, particular frequencies can be avoided, and adverse effects such as frequency resonance and a switching noise or ground bounce due to transmission of repeating patterns can be eliminated. Accordingly, reliability in terms of hardware can be improved (error rate can be reduced).

The check methods described in above described embodiments can be used not only for SATA-HDDs, etc. in which sector length is fixed but also for HDDs compatible with, for example SCSI or FC in which sector length can be extended. When such HDDs are employed, the methods can be performed in the same manner as the embodiments by using a normal (non-extended) 512-byte sector format.

In the foregoing, the invention made by the inventors of the present invention has been concretely described based on the embodiments. However, it is needless to say that the present invention is not limited to the foregoing embodiments and various modifications and alterations can be made within the scope of the present invention.

The disk array system of the present invention can be employed in, for example, a computer system which controls the data storage in a storage device such as HDD.

What is claimed is:

1. A method for checking correctness of object data stored in a disk array system, comprising:
providing the disk array system including a storage device, a controller, and a RAID control function,
writing the object data to an object data area in said storage device by: extracting a part of said object data as first data, embedding a check code in said first data via a first operation to provide check-code embedded first data with a data length identical with a data length of said first data, storing said first data in a control area which is separated from the object data area in said storage device, inserting said check-code embedded first data back into said object data to provide check-code embedded object data, and storing the check-code embedded object data in said storage device; and
reading said check-code embedded object data from said storage device by: fetching said check-code object data from said storage device, subjecting said fetched data to a second operation with the check code, and comparing data resulted from the second operation and the first data stored in said control area thereby checking the correctness of said object data after being stored in said storage device.

2. The method according to claim 1,
wherein the first operation is an exclusive OR operation, the second is an exclusive OR operation, and
in the comparing step within the reading step, said object data is judged to be correct when the data match, and judged to be abnormal when the data do not match.

3. The method according to claim 1, further comprising generating said check code by calculating based on an address of said object data in said storage device.

4. The method according to claim 1,
wherein said writing step is performed for each block of said object data with a predetermined size corresponding to a unit of processing data which is handled in said storage device; and
said reading step is performed for each block of said object data read from said storage device.

5. The method according to claim 1,
wherein said control area is provided in a memory which is included in said controller, and
said memory is selectively to be accessed directly from a processing unit in said controller which executes said writing and reading steps, and an access path from said processing unit to said memory is provided separately from an access path to said storage device.

6. The method according to claim 1,
wherein said control area is provided in a system area in said storage device which is separated from the object data area in said storage device.

7. The method to claim 1,
wherein, said object data is in a fixed unit, said first data is extracted from said object data from a plurality of locations including a data-updated location, and
said checking of the object data is performed by the use of the first data that corresponds t said plurality of locations.

8. The method according to claim 1, further comprising performing a striping process and a parity process on said object data to a group of said storage devices, and inputting or outputting stripped data and parity to or from the group of said storage devices according to said RAID function, and
wherein said writing and reading steps are performed for all said striped data and parity.

9. The method according to claim 1, further comprising performing a striping process and a parity on said object data to a group of said storage devices, and inputting or outputting stripped data and parity to or from the group of said storage devices according to said RAID function,
wherein said writing and reading steps are performed for only the parity but not said striped data, and
said parity process includes a parity check of said data by using the parity whose correctness has been checked by said reading step.

10. The method according to claim 1, further comprising mirroring said object data to a group of said storage devices, and inputting or outputting identical data to or from the group of said storage devices according to said RAID function, and
wherein said writing and reading steps are performed for only one of the mirrored data.

11. The method according to claim 1,
wherein said object data is processed in one unit of block with a predetermined size corresponding to a unit of block handled in said storage device, the first operation is an XOR operation, and the second operation is an XOR operation.

12. The method according to claim 1, further comprising performing a striping process and a parity process on said object data to a group of said storage devices, and inputting or outputting stripped data and parity to or from the group of said storage devices according to said RAID function, and
said reading step is executed at the save timing as a parity check by sampling the data stored in said storage device according to said RAID function.

13. The method according to claim 1, further comprising:
performing a handling process in accordance with an abnormality state of the disk array system which includes when said object data is judged to be abnormal according to said RAID function,
judging a type of the abnormality state, isolating a part of said storage device which has been judged to be abnormal, and
restoring the data stored in the part judged to be abnormal onto a redundant part of said storage device.

14. The method according to claim 1, further comprising:
converting data to avoid a specific data pattern by embedding an orderly code, which has been obtained by a calculation, in a part of said object dat other than said first data by:
in said writing step, generating a write pattern by performing an XOR operation on said orderly code and said part of said object data other than the first data, and writing the write pattern to the storage device, and
in said reading step, restoring said part of said object data other than the first data by performing an operation opposite to said XOR operation for the data read from said storage device, and correctness of said part of said object data other than the first data is checked by comparing the restored data with said object data other than the first data.

15. The method according to claim 1, further comprising switching storing destinations of said first data and said check-code embedded object data between said storage device and said control area in accordance with a data pattern of said object data, and
in formatting said storage device, said switching step is executed to store said first data in said control area side and to store said check-code embedded object data in said storage device side.

16. The method according to claim 1, wherein said writing step is performed for each sector of said object data with a predetermined size corresponding to a unit of processing data which is handled in said storage device, and
said reading step is performed for each sector of said object data read from said storage device.

17. A program embedded in a computer readable medium for checking correctness of object data stored in a disk array system including a storage device, a controller, and a RAID control function, comprising:
a module for writing the object data to said storage device by: extracting a part of said object data as first data, embedding a check code in said first data via a first operation to provide check-code embedded first data in a control area which is separated from said storage device, inserting said check-code embedded object data, and storing the check-code embedded object data in said storage device; and
a module for reading said check-code embedded object data from said storage device by: fetching said check-code embedded object data from said storage device, subjecting said fetched data to a second operation with the check code, and comparing data resulted from the second operation and the first data stored in said control area thereby checking the correctness of said object data after being stored in said storage device.

18. The program according to claim 17,
where the first operation is an exclusive OR operation, the second operation is an exclusive OR operation, and
in comparing within the module for reading, said object data is judged to be correct when the data match, and judged to be abnormal when the data do not match.

19. The program according to claim 17, further comprising a module for generating said check code by calculating based on an address of said object data in said storage device.

* * * * *